(12) United States Patent
Sidler et al.

(10) Patent No.: US 10,796,392 B1
(45) Date of Patent: Oct. 6, 2020

(54) SYSTEMS AND METHODS FOR FACILITATING BOOKING, BONDING AND RELEASE

(71) Applicant: Securus Technologies, Inc., Carrollton, TX (US)

(72) Inventors: James S. Sidler, Lubbock, TX (US); Lee R. Johnson, Allen, TX (US); John J. Viola, Frisco, TX (US); Luke Keiser, Frisco, TX (US)

(73) Assignee: Securus Technologies, LLC, Carrollton, TX (US)

( * ) Notice: Subject to any disclaimer, the term of this patent is extended or adjusted under 35 U.S.C. 154(b) by 570 days.

(21) Appl. No.: 15/727,995

(22) Filed: Oct. 9, 2017

Related U.S. Application Data

(63) Continuation of application No. 11/751,895, filed on May 22, 2007, now abandoned.

(51) Int. Cl.
*G06Q 50/26* (2012.01)
*G06Q 10/06* (2012.01)
*G06Q 40/02* (2012.01)

(52) U.S. Cl.
CPC ......... *G06Q 50/26* (2013.01); *G06Q 10/0635* (2013.01); *G06Q 40/025* (2013.01)

(58) Field of Classification Search
CPC .................. H04M 15/08; H04M 17/00; H04M 2215/0192; H04M 2215/62
See application file for complete search history.

(56) References Cited

U.S. PATENT DOCUMENTS

| 473,982 A | 5/1892 | Wallace |
| 3,096,404 A | 7/1963 | Semon |

(Continued)

FOREIGN PATENT DOCUMENTS

| EP | 0185365 A1 | 6/1986 |
| EP | 0 380 189 A2 | 8/1990 |

(Continued)

OTHER PUBLICATIONS

Karen Shastri, Ph.D., et al., "An evaluation of Video Preliminary Arraignment Systems in Pennsylvania," Fall 2004, 7 pages.

(Continued)

*Primary Examiner* — Aryan E Weisenfeld
(74) *Attorney, Agent, or Firm* — Fogarty LLP

(57) ABSTRACT

Systems and methods for assisting individuals, such as to provide assistance with respect to detainees at an inmate facility, are provided. Embodiments facilitate booking, bonding, and release with respect to an inmate facility by providing assistance to a detainee communicating with service providers and friends and family. Assistance may include prequalifying a detainee for services, collecting information useful to the service provider, and providing collected information to the service provider. Assistance may include collecting information useful to the friend or family member and providing collected information to the friend or family member. Embodiments communicate with banking systems to allow a detainee or friends and family to employ various payment techniques in posting bail or in making payment to a service provider. Additional functionality, such as call accounting/logging, call recording, and message delivery, automated response, may be provided. Embodiments employ various profiles to facilitate providing assistance.

14 Claims, 3 Drawing Sheets

(56) References Cited

U.S. PATENT DOCUMENTS

| | | |
|---|---|---|
| 3,113,185 A | 12/1963 | Semon |
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,798,382 A | 3/1974 | Hoven |
| 3,813,495 A | 5/1974 | Conerly |
| 3,829,617 A | 8/1974 | Caithamer et al. |
| 3,851,121 A | 11/1974 | Marvin |
| 3,864,519 A | 2/1975 | Owen |
| 3,952,160 A | 4/1976 | Pasternack et al. |
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,593,157 A | 6/1986 | Usdan |
| 4,595,983 A | 6/1986 | Gehalo et al. |
| 4,602,129 A | 7/1986 | Matthews et al. |
| 4,585,904 A | 12/1986 | Mincone et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 9/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,782,516 A | 11/1988 | Maybach et al. |
| 4,791,640 A | 12/1988 | Sand |
| 4,794,642 A | 12/1988 | Arbabzadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,869 A | 6/1991 | Grover et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 11/1992 | Dowden et al. |
| 5,164,989 A | 11/1992 | Brandman et al. |
| 5,181,237 A | 1/1993 | Dowden et al. |
| 5,185,781 A | 2/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor et al. |
| 5,222,120 A | 6/1993 | McLeod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |

(56) References Cited

U.S. PATENT DOCUMENTS

| | | |
|---|---|---|
| 5,351,287 A | 9/1994 | Bhattacharyya et al. |
| 5,355,403 A | 10/1994 | Richardson, Jr. et al. |
| 5,359,642 A | 10/1994 | Castro |
| 5,359,643 A | 10/1994 | Gammino |
| 5,369,699 A | 11/1994 | Page et al. |
| 5,375,161 A | 12/1994 | Fuller et al. |
| 5,381,474 A | 1/1995 | Landemaki et al. |
| 5,394,465 A | 2/1995 | Jo |
| 5,416,831 A | 5/1995 | Chewning, III et al. |
| 5,425,087 A | 6/1995 | Gerber et al. |
| 5,428,662 A | 6/1995 | Hamilton |
| 5,442,696 A | 8/1995 | Lindberg et al. |
| 5,448,625 A | 9/1995 | Lederman |
| 5,450,485 A | 9/1995 | Hamilton |
| 5,452,347 A | 9/1995 | Iglehart et al. |
| 5,455,819 A | 10/1995 | Sugiyama |
| 5,461,665 A | 10/1995 | Shur et al. |
| 5,463,677 A | 10/1995 | Bash et al. |
| 5,465,293 A | 11/1995 | Chiller et al. |
| 5,465,387 A | 11/1995 | Mukherjee |
| 5,471,519 A | 11/1995 | Howe et al. |
| 5,473,686 A | 12/1995 | Virdee |
| 5,483,581 A | 1/1996 | Hird et al. |
| 5,483,582 A | 1/1996 | Pugh et al. |
| 5,483,593 A | 1/1996 | Gupta et al. |
| 5,485,507 A | 1/1996 | Brown et al. |
| 5,497,414 A | 3/1996 | Bartholomew |
| 5,504,810 A | 4/1996 | McNair |
| 5,517,555 A | 5/1996 | Amadon et al. |
| 5,524,141 A | 6/1996 | Braun et al. |
| 5,524,145 A | 6/1996 | Parker |
| 5,535,261 A | 7/1996 | Brown et al. |
| 5,539,812 A | 7/1996 | Kitchin et al. |
| 5,544,231 A | 8/1996 | Cho |
| 5,566,229 A | 10/1996 | Hou et al. |
| 5,577,116 A | 11/1996 | Townsend et al. |
| 5,583,920 A | 12/1996 | Wheeler, Jr. |
| 5,583,925 A | 12/1996 | Bernstein |
| 5,583,934 A | 12/1996 | Zhou |
| 5,592,537 A | 1/1997 | Moen |
| 5,606,604 A | 2/1997 | Rosenblatt et al. |
| 5,615,408 A | 3/1997 | Johnson et al. |
| 5,617,471 A | 4/1997 | Rogers et al. |
| 5,619,561 A | 4/1997 | Reese |
| 5,627,887 A | 5/1997 | Freedman |
| 5,634,126 A | 5/1997 | Norell |
| 5,651,056 A | 7/1997 | Eting et al. |
| 5,655,013 A | 8/1997 | Gainsboro |
| 5,682,386 A | 10/1997 | Arimili et al. |
| 5,715,298 A | 2/1998 | Rogers |
| 5,722,418 A | 3/1998 | Bro |
| 5,724,404 A | 3/1998 | Garcia et al. |
| 5,742,667 A | 4/1998 | Smith |
| 5,742,905 A | 4/1998 | Pepe et al. |
| 5,745,553 A | 4/1998 | Mirville et al. |
| 5,745,558 A | 4/1998 | Richardson, Jr. et al. |
| 5,748,711 A | 5/1998 | Scherer |
| 5,757,781 A | 5/1998 | Gilman et al. |
| 5,768,355 A | 6/1998 | Salibrici et al. |
| 5,777,558 A | 7/1998 | Pennypacker et al. |
| 5,796,811 A | 8/1998 | McFarlen |
| 5,797,124 A | 8/1998 | Walsh et al. |
| 5,799,068 A | 8/1998 | Kikinis et al. |
| 5,805,685 A | 9/1998 | McFarlen |
| 5,809,125 A | 9/1998 | Gammino |
| 5,825,857 A | 10/1998 | Reto et al. |
| 5,832,068 A | 11/1998 | Smith |
| 5,835,580 A | 11/1998 | Fraser |
| 5,844,978 A | 12/1998 | Reuss et al. |
| 5,854,833 A | 12/1998 | Hogan et al. |
| 5,859,900 A | 1/1999 | Bauer et al. |
| 5,859,902 A | 1/1999 | Freedman |
| 5,859,907 A | 1/1999 | Kawahara et al. |
| 5,862,519 A | 1/1999 | Sharma et al. |
| 5,867,559 A | 2/1999 | Jorgensen et al. |
| 5,867,566 A | 2/1999 | Hogan et al. |
| 5,870,723 A | 2/1999 | Pare, Jr. et al. |
| 5,875,230 A | 2/1999 | Ganley et al. |
| 5,875,236 A | 2/1999 | Jankowitz et al. |
| 5,883,945 A | 3/1999 | Richardson, Jr. et al. |
| 5,894,511 A | 4/1999 | Jordan |
| 5,907,602 A | 5/1999 | Peel et al. |
| 5,915,001 A | 6/1999 | Uppaluru |
| 5,923,733 A | 7/1999 | Binns et al. |
| 5,923,746 A | 7/1999 | Baker et al. |
| 5,926,533 A | 7/1999 | Gainsboro |
| 5,937,042 A | 8/1999 | Sofman |
| 5,937,044 A | 8/1999 | Kim |
| 5,943,403 A | 8/1999 | Richardson et al. |
| 5,946,386 A | 8/1999 | Rogers et al. |
| 5,960,064 A | 9/1999 | Foladare et al. |
| 5,960,416 A | 9/1999 | Block |
| 5,963,625 A | 10/1999 | Kawecki et al. |
| 5,966,351 A | 10/1999 | Carleton et al. |
| 5,970,124 A | 10/1999 | Csaszar et al. |
| 6,029,062 A | 2/2000 | Hanson |
| 6,031,898 A | 2/2000 | Jordan |
| 6,035,025 A | 3/2000 | Hanson |
| 6,038,315 A | 3/2000 | Strait et al. |
| 6,044,247 A | 3/2000 | Taskett et al. |
| 6,052,454 A | 4/2000 | Kek et al. |
| 6,064,963 A | 5/2000 | Gainsboro |
| 6,064,972 A | 5/2000 | Jankowitz et al. |
| 6,031,895 A | 6/2000 | Cohn et al. |
| 6,072,860 A | 6/2000 | Kek et al. |
| 6,075,843 A | 6/2000 | Cave |
| 6,078,892 A | 6/2000 | Anderson et al. |
| 6,088,431 A | 7/2000 | LaDue |
| 6,097,804 A | 8/2000 | Gilbert et al. |
| 6,108,642 A | 8/2000 | Findley |
| 6,134,320 A | 10/2000 | Swan et al. |
| 6,141,406 A | 10/2000 | Johnson |
| 6,147,977 A | 11/2000 | Thro et al. |
| 6,169,789 B1 | 1/2001 | Rao et al. |
| 6,173,284 B1 | 1/2001 | Brown |
| 6,175,831 B1 | 1/2001 | Weinreich et al. |
| RE37,073 E | 2/2001 | Hammond |
| 6,188,751 B1 | 2/2001 | Scherer |
| 6,195,422 B1 | 2/2001 | Jones et al. |
| 6,222,912 B1 | 4/2001 | Breuer |
| 6,226,364 B1 | 5/2001 | O'Neil |
| 6,226,366 B1 | 5/2001 | Bala et al. |
| 6,249,570 B1 | 6/2001 | Glowny et al. |
| 6,282,276 B1 | 8/2001 | Felger |
| 6,307,926 B1 | 10/2001 | Barton et al. |
| 6,308,171 B1 | 10/2001 | De La Huerga |
| 6,327,345 B1 | 12/2001 | Jordan |
| 6,330,546 B1 | 12/2001 | Gopinathan et al. |
| 6,353,663 B1 | 3/2002 | Stevens et al. |
| 6,366,653 B1 | 4/2002 | Yeh et al. |
| 6,373,930 B1 | 4/2002 | McConnell et al. |
| 6,377,938 B1 | 4/2002 | Block et al. |
| 6,381,321 B1 | 4/2002 | Brown et al. |
| 6,393,113 B1 | 5/2002 | Karras |
| 6,396,915 B1 | 5/2002 | Springer et al. |
| 6,397,055 B1 | 5/2002 | McHenry et al. |
| 6,404,857 B1 | 6/2002 | Blair et al. |
| 6,404,870 B1 | 6/2002 | Kia et al. |
| 6,405,028 B1 | 6/2002 | DePaola et al. |
| 6,430,274 B1 | 8/2002 | Winstead et al. |
| 6,434,378 B1 | 8/2002 | Fougnies |
| 6,445,682 B1 | 9/2002 | Weitz |
| 6,483,910 B1 | 11/2002 | Council |
| 6,496,477 B1 | 12/2002 | Perkins et al. |
| 6,516,056 B1 | 2/2003 | Justice et al. |
| 6,529,500 B1 | 3/2003 | Pandharipande |
| 6,529,602 B1 | 3/2003 | Walker et al. |
| 6,549,613 B1 | 4/2003 | Dikmen |
| 6,553,336 B1 | 4/2003 | Johnson et al. |
| 6,560,323 B2 | 5/2003 | Gainsboro |
| 6,560,325 B2 | 5/2003 | Brown et al. |
| 6,611,583 B1 | 8/2003 | Gainsboro |
| 6,621,812 B1 | 9/2003 | Chapman et al. |
| 6,631,186 B1 | 10/2003 | Adams et al. |

(56) References Cited

U.S. PATENT DOCUMENTS

| | | |
|---|---|---|
| 6,636,591 B1 | 10/2003 | Swope et al. |
| 6,639,977 B1 | 10/2003 | Swope et al. |
| 6,639,978 B2 | 10/2003 | Draizin et al. |
| 6,654,722 B1 | 11/2003 | Aldous et al. |
| 6,658,393 B1 | 12/2003 | Basch et al. |
| 6,665,380 B1 | 12/2003 | Cree et al. |
| 6,668,045 B1 | 12/2003 | Mow |
| 6,687,360 B2 | 2/2004 | Kung et al. |
| 6,731,630 B1 | 5/2004 | Schuster et al. |
| 6,782,370 B1 | 8/2004 | Stack |
| 6,788,775 B1 | 9/2004 | Simpson |
| 6,795,444 B1 | 9/2004 | Vo et al. |
| 6,816,469 B1 | 11/2004 | Kung et al. |
| 6,836,540 B2 | 12/2004 | Falcone et al. |
| 6,876,647 B2 | 4/2005 | Celi, Jr. |
| 6,904,139 B2 | 6/2005 | Brown et al. |
| 6,920,209 B1 | 7/2005 | Gainsboro |
| 6,947,532 B1 | 9/2005 | Marchand et al. |
| 7,035,385 B2 | 4/2006 | Levine et al. |
| 7,039,171 B2 | 5/2006 | Gickler |
| 7,042,992 B1 | 5/2006 | Falcone et al. |
| 7,046,782 B2 | 5/2006 | Miller |
| 7,075,919 B1 | 7/2006 | Wendt et al. |
| 7,075,922 B2 | 7/2006 | Mussman et al. |
| 7,079,636 B1 | 7/2006 | McNitt et al. |
| 7,085,359 B2 | 8/2006 | Crites et al. |
| 7,106,843 B1 | 9/2006 | Gainsboro et al. |
| 7,133,845 B1 | 11/2006 | Ginter et al. |
| 7,158,621 B2 * | 1/2007 | Bayne .................. H04M 15/08 379/114.13 |
| 7,180,997 B2 | 2/2007 | Knappe |
| 7,188,360 B2 | 3/2007 | Gerdes et al. |
| 7,203,301 B1 | 4/2007 | Mudd et al. |
| 7,221,743 B2 | 5/2007 | Trinkel |
| 7,302,053 B2 | 11/2007 | Chang et al. |
| 7,333,798 B2 | 2/2008 | Hodge |
| 7,360,087 B2 | 4/2008 | Jorgensen et al. |
| 7,360,090 B1 | 4/2008 | Doskow et al. |
| 7,372,949 B1 | 5/2008 | Kurth et al. |
| 7,376,622 B1 | 5/2008 | Padalino et al. |
| 7,492,881 B1 | 2/2009 | Hite et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,561,680 B1 | 7/2009 | Falcone et al. |
| 7,640,190 B1 | 12/2009 | Sullivan et al. |
| 7,664,689 B1 | 2/2010 | Rosenfield et al. |
| 7,698,182 B2 | 4/2010 | Falcone et al. |
| 7,899,167 B1 | 3/2011 | Rae |
| 7,916,845 B2 | 3/2011 | Rae et al. |
| 8,000,269 B1 | 8/2011 | Rae et al. |
| 8,064,452 B2 | 11/2011 | Croak et al. |
| 2001/0028649 A1 | 10/2001 | Pogossiants et al. |
| 2001/0028705 A1 | 10/2001 | Adams et al. |
| 2001/0036821 A1 | 11/2001 | Gainsboro et al. |
| 2001/0039516 A1 | 11/2001 | Bennett et al. |
| 2001/0041590 A1 | 11/2001 | Silberfenig et al. |
| 2001/0047333 A1 | 11/2001 | Kim et al. |
| 2002/0025028 A1 | 2/2002 | Manto |
| 2002/0059148 A1 | 5/2002 | Rosenhaft et al. |
| 2002/0067272 A1 | 6/2002 | Lemelson et al. |
| 2002/0069084 A1 | 6/2002 | Donovan |
| 2002/0071537 A1 | 6/2002 | Gainsboro |
| 2002/0077889 A1 | 6/2002 | Kolls |
| 2002/0106065 A1 | 8/2002 | Joyce et al. |
| 2002/0106998 A1 | 8/2002 | Presley et al. |
| 2002/0107871 A1 | 8/2002 | Wyzga et al. |
| 2002/0115424 A1 | 8/2002 | Bagoren et al. |
| 2002/0136374 A1 | 9/2002 | Fleischer, III et al. |
| 2002/0141386 A1 | 10/2002 | Minert et al. |
| 2002/0147002 A1 | 10/2002 | Trop et al. |
| 2002/0147707 A1 | 10/2002 | Kraay et al. |
| 2002/0159440 A1 | 10/2002 | Mussman et al. |
| 2002/0168060 A1 | 11/2002 | Huie |
| 2002/0184103 A1 | 12/2002 | Shah et al. |
| 2002/0194096 A1 | 12/2002 | Falcone et al. |
| 2002/0194113 A1 | 12/2002 | Lof et al. |
| 2003/0002639 A1 | 1/2003 | Huie |
| 2003/0008634 A1 | 1/2003 | Laybourn et al. |
| 2003/0023714 A1 | 1/2003 | Zeigler et al. |
| 2003/0023874 A1 | 1/2003 | Prokupets et al. |
| 2003/0037063 A1 | 2/2003 | Schwartz |
| 2003/0046208 A1 | 3/2003 | Lubking et al. |
| 2003/0070076 A1 | 4/2003 | Michael |
| 2003/0076940 A1 | 4/2003 | Manto |
| 2003/0086546 A1 | 5/2003 | Falcone et al. |
| 2003/0091028 A1 | 5/2003 | Chang et al. |
| 2003/0093533 A1 | 5/2003 | Ezerzer et al. |
| 2003/0112934 A1 | 6/2003 | Draizin et al. |
| 2003/0112936 A1 | 6/2003 | Brown et al. |
| 2003/0126470 A1 | 7/2003 | Crites et al. |
| 2003/0133558 A1 | 7/2003 | Kung et al. |
| 2003/0138084 A1 | 7/2003 | Lynam et al. |
| 2003/0162526 A1 | 8/2003 | Ogman et al. |
| 2003/0174826 A1 | 9/2003 | Hesse |
| 2003/0190045 A1 | 10/2003 | Huberman et al. |
| 2003/0198325 A1 | 10/2003 | Bayne |
| 2003/0200182 A1 | 10/2003 | Truitt et al. |
| 2003/0236751 A1 | 12/2003 | Settle, III |
| 2004/0029564 A1 | 2/2004 | Hodge |
| 2004/0052218 A1 | 3/2004 | Knappe |
| 2004/0078328 A1 | 4/2004 | Talbert et al. |
| 2005/0043014 A1 | 2/2005 | Hodge |
| 2005/0141678 A1 | 6/2005 | Anders |
| 2006/0102717 A1 | 5/2006 | Wood et al. |
| 2006/0209797 A1 | 9/2006 | Anisimov et al. |
| 2006/0245559 A1 * | 11/2006 | Hodge .................. H04L 51/38 379/88.19 |
| 2006/0285650 A1 | 12/2006 | Hodge |
| 2006/0286962 A1 | 12/2006 | Davis |
| 2007/0041545 A1 | 2/2007 | Gainsboro |
| 2007/0071206 A1 | 3/2007 | Gainsboro et al. |
| 2007/0115924 A1 | 5/2007 | Schneider et al. |
| 2007/0156462 A1 * | 7/2007 | Kazanchian .......... G06Q 40/08 705/4 |
| 2007/0242658 A1 | 10/2007 | Rae et al. |
| 2007/0263812 A1 | 11/2007 | Palazola et al. |
| 2008/0040780 A1 | 2/2008 | Reinhold |
| 2008/0094926 A1 | 4/2008 | Neel |

FOREIGN PATENT DOCUMENTS

| | | |
|---|---|---|
| EP | 0814583 A2 | 12/1997 |
| FR | 2600850 A1 | 12/1987 |
| GB | 2134749 A | 8/1984 |
| JP | 05-030193 A | 2/1993 |
| JP | 06-303305 A | 10/1994 |
| JP | 06-333054 A | 12/1994 |
| JP | 2003110758 A | 4/2003 |
| WO | 96/20448 A1 | 7/1996 |
| WO | 97/22208 A2 | 6/1997 |
| WO | 98/13993 A1 | 4/1998 |
| WO | 98/23062 A1 | 5/1998 |
| WO | 98/32275 A1 | 7/1998 |
| WO | 00/22908 A2 | 4/2000 |
| WO | 00/54491 A1 | 9/2000 |

OTHER PUBLICATIONS

King Stahlman Bail Bonds, http://web.archive.org/web/20060425081547/http://www.kingstahlmanbail.com/whatisabailbond.html, Wayback Machine, Apr. 25, 2006, 2 pages.

"How Credit Scoring Helps You," http://web.archive.org/web/20050404082955/http://www.myfico.com/CreditEducation/ScoringHelps.aspx?fire=5, Wayback Machine, Apr. 4, 2005, 2 pages.

Wells, Mike (Computers Link Inmates to Answers, http://proquest.umi.com/pqdweb?index=21&did=883908601&SrchMode=1&sid=1&Fmt=3&Vlnst=PROD&VType=PQD&RQT=309&VName=PQD&TS=1258574057&clientId=19649, Tampa Tribune, Tampla, Fla, Aug. 15, 2005.), 4 pages.

Templeton, Brad, Reaction to the DEC Spam of 1978, http://www.templetons.com/brad/spamreact.html, May 12, 2009, 16 pages.

(56) References Cited

OTHER PUBLICATIONS

Associated Press, Missoula Jail Adding Credit-Card Option for Bail, http://www.helenair.com/articles/2007/03/05/montana _top/000jail. txt, Mar. 5, 2007, 4 pages.

Caston, Phillip, Widespread Plastic: Concertgoers post bail on credit cards, http://www.accessmylibrary.com/coms2/summary_ 0286- 844631_ITM, Oct. 18, 2003, 3 pages.

Federal Prisoner Health Care Copayment Act of 2000, House of Representatives Report 106-851, 106th Congress 2d Session, 22 pages.

Groenfeldt, Tom (CFO: The Magazine for Senior Financial Executives v11 n10 pp. 97-99, Oct. 1995), 4 pages.

Viola; John J., et al.; U.S. Appl. No. 10/135,878, "Information Management and Movement System and Method," filed Apr. 29, 2002, 44 pages.

Falcone; Richard, et al., U.S. Appl. No. 10/360,442, "Systems and Methods for Transaction Authorization Determination," filed Feb. 7, 2003, 37 pages.

International Search Report, International Application No. PCT/US 01/41744 dated Sep. 10, 2002, 4 pages.

Microdevices Incorporated, "Message Desk, Functional Specification," Oct. 27, 1986, 8 pages.

"SciDyn VoIP Technology Now Available for Call Control Solutions", SciDyn™ Press Release, [online] [Retrieved on Nov. 4, 2005] Retrieved from: http://www.scidvn.com/news/or/0122or. html, 2 pages.

"Call Control—Commander II:", SciDyn™ Products, [online] [Retrieved on Nov. 4, 2005] Retrieved from http://www.scidyn.com/ products/commander2.html.

"Smart Features for Optimizing Your Network", SciDyn™ BubbleUNK®, [online] [Retrieved on Nov. 4, 20051 Retrieved from: httn://www.scidvn.com/oroducts/bubble.html.

"BubbleLINK® Software Architecture", SciDyn™, The Voice of IP Technology™, [online] [Retrieved on Nov. 4, 2005] Retrieved from: htto://www.scidvn.com/oroducts/BubbleLin%20White.odf.

"ShoreTel—Intelligent Phone Systems", ShoreTel, [online] [Retrieved on Nov. 4, 2005] Retrieved from: http://www.shoretel.com/STCoro/ oroducts/architecture.asox.

Lee, K., "Large-Vocabulary Speaker-Independent Continuous Speech Recognition Using HMM," Carnegie Mellon Universitv Department of Electrical and Computer Enaineerina, CMU-CS-88-148, Apr. 1988.

Manual for "DPD/120-JP Dial Pulse Detection Board," Dialogic Systems Ltd., Tokyo, Japan, (Product described in U.S. Pat. No. 5,218,636), undated.

OSSGR, vol. 3, "Feature Specific Documents," Technical Ref. TSY-000271 FSD 85-01-0100 Calling Card Service—Published by Bell Communications Research—Revision #3, Dated Mar. 1988.

OSSGR, vol. 3, "Feature Specific Documents," Technical Ref. TSY-000271 FSD-85-01-0200 Collect Billing—Published by Bell Communications Research—Revision #3 Dated Mar. 1988.

PCT International Search Report, PCT/US99/09493, dated Aug. 20, 1999, 5 pages.

PCT Written Opinion, PCT/US99/09493, dated Feb. 9, 2000, 12 pages.

"PPCS (Prison Prepaid Card System)", DiaVox Technologies, Inc., Nov. 2000, 10 pages.

Scidyn Commander 3-Way Call Detection System [online] [Retrieved on Jun. 20, 2006] Retrieved from: http://www.scidvn.com/products/ Commander%203-wav%20Detection.pdf, 5 pages.

"System 20" Value Added Communications (VAC), Nov. 1992, Brochure, 4 pages.

Telematic "ConQuest III Inmate Telephone System," Nov. 1992.

Thermos, P., "Two Attacks Against VoIP," Security Focus, XP-002444627, Apr. 4, 2006, pp. 1-8.

Anderson, Susan, "Three-Way Call Detect . . . Close Enough to Perfect?" Correctional Communications Quarterlv, pp. 16-20, Oct. 1993.

Bahl, L. "A Maximum Likelihood Approach to Continuous Speech Recovery," Readings in Speech Recognition, Ed. A. Waibel and K. Lee, Morgan Kaufmann Publishers, pp. 308-319, IEEE 1983.

Batten, A. "Personal Communications Service and the Intelligent Network," British Telecommunications Enaineerina, vol. 9, pp. 88-91, Aug. 1990.

European Examination Report, EP07251570.3, dated May 29, 2008, 5 pages.

HR Solutions, http://www.solutions.hrd.com/methods_of_electronic_ monitoring.htm, p. 4 of 5, Telephone Surveillance.

Jones International, http://www.jonesencyclo.com/encyclo/update/ ecpa.html, 1-7, Electronic Communications Privacy Act.

LazerVoice, Digital Recording System Inmate Services, 1997-1998, Schlumberger Technologies, Inc. / LazerVoice STIL V0222 LazerVoice User's Manual—Version 2.22, pp. 1-41, published Apr. 28, 1998 by Schlumberger Technologies, Inc./LazerVoice of Mobile, Alabama.

"LazerPhone User Reference Manual," 150 pages, edition and publisher unknown.

"LazerPhone Inmate Telephone System, Users Manual version 1.0," pp. 1-29, published Oct. 1998 by Schlumberaer Technoloaies, Inc./Global Tel*Link of Mobile, Alabama.

LazerPhone, Powerful Performance Uncompromising Standards, 1998.

Lazer Phone Technical Manual, "Chapter I. System Overview," pp. 1.1-1.6, published by Schlumberger Technologies, Inc. of Mobile, Alabama.

"VoIP the Evolving Solution and the Evolving Threat," Internet Security Systems, Inc., XP-002444626, 2004, pp. 1-7.

Lord; Michael H., U.S. Appl. No. 09/995,253, "Method and Apparatus for Exchanging Data Between a Primary Computer System and an External Computer System to Ensure Transaction Reconciliation Between the Systems" filed Nov. 27, 2001, 39 pages.

Viola; John J., et al.; U.S. Appl. No. 10/720,732, "Information Management and Movement System and Method," filed Nov. 24, 2003, 72 pages.

Dye; Charles, "ProQuest Information and Learning—1565924320", Oracle Distributed Systems, Apr. 1, 1999, 29 pages, O'Reilly Media, Inc.

I2 Investigative Analysis Software; "i2 TextChart—Text Visualized", URL: http://www.i2.eo.uk/Products/i2TextChart/, Jun. 13, 2005, 2 pages.

I2 Investigative Analysis Software; "iBase-Information Captured", URL: http://www.i2.eo.uk/Products/iBase/, Jun. 13, 2005, 2 pages.

I2 Investigative Analysis Software; "iBridge", URL: http://www. i2.co.uk/Products/iBridge/, Jun. 13, 2005, 1 page.

I2 Investigative Analysis Software; "Chart Reader", URL: http:// www.i2.eo.uk/Products/Chart Reader. Jun. 13, 2005, 1 page.

I2 Investigative Analysis Software; "Pattern Tracer", URL: http:// www.i2.eo.uk/Products/Pattern Tracer/. Jun. 13, 2005, 1 page.

I2 Investigative Analysis Software; "Prisons", URL: http://www.i2. eo.uk/Solutions/Prisons/default.asp. Jun. 13, 2005, 1 page.

I2 Investigative Analysis Software; "Setting International Standards for Investigative Analysis", URL: http://www.i2.co.uk/Products/ index.htm. Jun. 13, 2005, 1 page.

Robert O'Harrow, Jr., "U.S. Backs Florida's New Counterterrorism Database; 'Matrix' Offers Law Agencies Faster Access to Americans' Personal Records: [Final Edition]," Aug. 6, 2003, p. A01, The Washington Post, Washington D.C.

Robert O'Harrow, Jr., The Dallas Morning News, "Database will make tracking suspected terrorists easier," Aug. 6, 2003, p. 7A.

Langford, Jeff, "Justice & Public Safety Solutions," Microsoft White Paper: Integrated Justice Information Systems, retrieved from Microsoft Justice & Public Safety Solutions (Nov. 5, 2002), http://jps.directtaps.net/_vti_bin/owssvr.dll?Using=Default% 2ehtml, 24 pages.

Imagis Technologies, Inc., "Computer Arrest and Booking System", [retrieved from http://www.imagistechnologies.com/Product/CABS. html (Nov. 5, 2002), 5 pages.

Imagis Technologies, Inc., "Integrated Justice System—Web-based Image and Data Sharing" [retrieved from http://www. imagistechnologies.com/Product/IJISFramework.htm] (Nov. 5, 2002), 4 pages.

(56) References Cited

OTHER PUBLICATIONS

Womack Brian, Boise dot.com aids transfers of money to prison inmates, The Idaho Business Review, Jan. 22, 2001. p. A7, vol. 20, Iss. 12.
Viola; John J., et al.; U.S. Appl. No. 10/720,848, "Iinformation Management and Movement System and Method," filed Nov. 24, 2003, 72 pages.
Hauck et al., Article entitled: "Coplink: A Case of Intelligent Analysis and Knowledge Management", dated Dec. 1999, pp. 15-28.
Fischer; Alan D., Article entitled: "COPLINK nabs criminals faster", dated Jan. 7, 2001, 5 pages.
Chau et al., Article entitled: "Building an Infrastructure for Law Enforcement Information Sharing and Collaboration: Design Issues and Challenges", dated 2001, 6 pages.
Sidler; James S., et al.; U.S. Appl. No. 11/182,625, "Systems and Methods for Acquiring, Accessing, and Analyzing Investigative Information," filed Jul. 15, 2005, 72 pages.
Wilkinson, et al., "Visiting in Prison", Visiting in Prison Published in Prison and Jail Administration's Practices and Theory, 1999, 7 pages.

\* cited by examiner

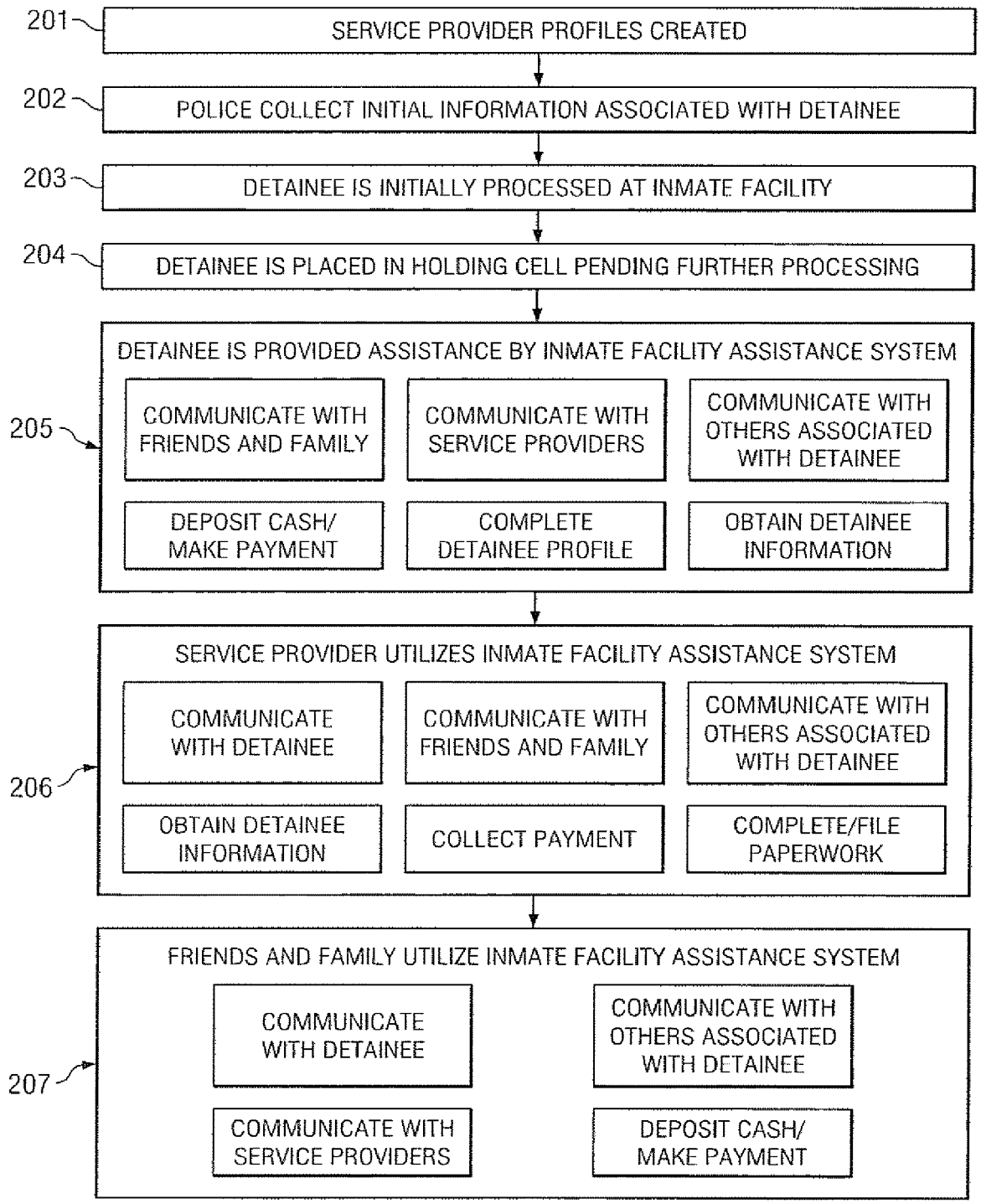

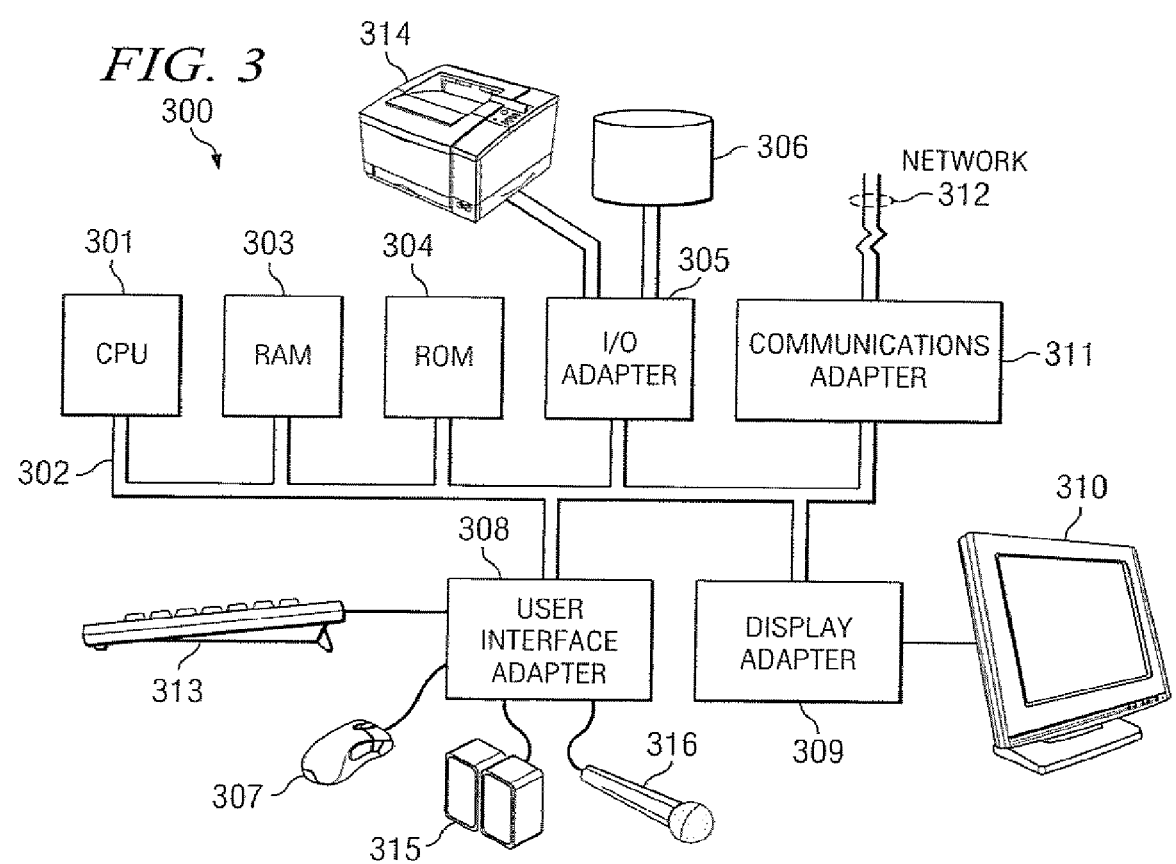

SYSTEMS AND METHODS FOR FACILITATING BOOKING, BONDING AND RELEASE

CROSS-REFERENCE TO RELATED APPLICATIONS

This is a continuation of, and claims benefit of, U.S. patent application Ser. No. 11/751,895, also entitled Systems and Methods for Facilitating Booking, Bonding and Release, filed, May 22, 2007, which is hereby incorporated herein by reference U.S. patent application Ser. No. 11/751,895, and hence the present application, are related to and commonly assigned U.S. patent application Ser. No. 10/135,878 entitled "Information Management and Movement System and Method," filed Apr. 29, 2002, now abandoned; Ser. No. 10/135,883 entitled "Optimizing Profitability in Business Transactions," filed Apr. 29, 2002, and issued on Apr. 13, 2010, as U.S. Pat. No. 7,698,182; Ser. No. 10/360,248 entitled "System and Method for Account Establishment and Transaction Management Using Interrupt Messaging," filed Feb. 7, 2003, and issued on May 9, 2006, as U.S. Pat. No. 7,042,992; Ser. No. 10/360,442 entitled "Systems and Methods for Transaction Authorization Determination," filed Feb. 7, 2003, now abandoned; Ser. No. 10/602,233 entitled "System and Method for Transaction and Information Management," filed Jun. 24, 2003, and issued on Dec. 29, 2009, as U.S. Pat. No. 7,640,190; Ser. No. 10/640,505 entitled "Called Party Controlled Message Delivery," filed Aug. 13, 2003, and issued on Jul. 14, 2009, as U.S. Pat. No. 7,561,680; Ser. No. 10/642,532 entitled "Centralized Call Processing," filed Aug. 15, 2003, and issued on Mar. 1, 2011, as U.S. Pat. No. 7,899,167; Ser. No. 10/720,732 entitled "Information Management and Movement System and Method," filed Nov. 24, 2003, now abandoned; Ser. No. 10/836,976 entitled "Systems and Methods for Transaction and Information Management," filed Apr. 30, 2004, and issued on Feb. 16, 2010, as U.S. Pat. No. 7,664,689; Ser. No. 10/720,848 entitled "Information Management and Movement System and Method," filed Nov. 24, 2003, now abandoned; Ser. No. 10/952,327 entitled "Systems and Methods for Management and Dissemination of Information for Controlled Environment Facility," filed Sep. 28, 2004, and issued on Apr. 14, 2009, as U.S. Pat. No. 7,519,169; and Ser. No. 11/182,625 entitled "Systems and Methods for Acquiring, Accessing, and Analyzing Investigative Information," filed Jul. 15, 2005, now abandoned. The disclosures of each of the above remain incorporated into U.S. patent application Ser. No. 11/751,895 by reference, and hence are hereby incorporated herein by reference.

TECHNICAL FIELD

The invention relates generally to inmate facility information processing and, more particularly, to facilitating booking, bonding, and release with respect to an inmate facility.

BACKGROUND OF THE INVENTION

Inmate facilities, such as jails, prisons, stockades, brigs, penitentiaries, etcetera, are generally experiencing issues with overcrowding. Specifically, inmate facilities are often being called upon to house numbers of inmates exceeding the numbers for which such facilities were designed, leading to shortages of cells, beds, staff, and other resources and often resulting in unsafe environments both for the inmates and staff.

A relatively large number of inmates in such facilities meet one or more criteria suitable for their release from a facility in which they are housed. For example, inmates may be awaiting trial on a misdemeanor offense, a first time offender with a low flight risk, or convicted of a crime for which payment of a monetary fine is acceptable in lieu of incarceration. However, because of an inability to obtain funds for payment of fines or for bonding, an inability to contact friends, family, a bonding agent, or an attorney, etcetera, the inmate may not be able to secure release from the inmate facility, although otherwise eligible for such release.

Oftentimes considerable time and expense is involved in accepting an inmate into an inmate facility. For example, an individual may be identified on the street by a member of the police department as having an outstanding warrant for arrest or may otherwise be taken into custody by police or other officer of the court. Such an arresting officer must typically complete at least some paperwork identifying the individual, the reason for arrest or detaining the individual, property impounded, etcetera. The detainee may then be transported to an inmate facility, such as a municipal or county jail for further processing.

There is typically some initial period of time where the detainee is incarcerated at the inmate facility but has not been fully processed as an inmate thereof. For example, a detainee may have been photographed, fingerprinted, and entered into an initial set of books at the inmate facility, but the inmate may be required to be arraigned (e.g., brought before a judge to hear the charges and to establish bail) before that detainee is housed and thus becomes an inmate of that inmate facility. Moreover, before being fully processed into the inmate facility, a detainee may go through a classification process, medical examination, hygienic processing (e.g., shower and delousing), etcetera, and a staff member may be required to complete a file in an inmate management system for the detainee. The foregoing requires appreciable time to accomplish and may present security and personnel issues. For example, transporting a detainee alone or in a group from an inmate facility to a courthouse for arraignment presents security risks and often requires substantial equipment and personnel. Likewise, classification processing, medical examination, hygienic processing, and the like often require substantial equipment and personnel.

In the time before the detainee is further processed to be housed in the inmate facility as an inmate, the detainee may be placed in a holding cell. Often the law requires that such a detainee be given access to a telephone for placing one or more calls, whether free or for charge, to seek assistance from someone outside of the inmate facility, such as a friend or family member, an attorney, a bail bondsman, etcetera. However, inmate facilities generally do not have any means by which to confirm that a detainee has actually been able to take advantage of the access to the telephone or even the number of calls the detainee has made. For example, a plurality of detainees may be incarcerated in the same holding cell, making it difficult to determine if any particular detainee has accessed a telephone disposed therein. Moreover, even if a particular detainee has been able to access a telephone, an inmate facility generally does not have the ability to determine if the detainee has actually been able to contact anyone for assistance.

A list of attorneys and/or bail bondsmen may be disposed near the aforementioned telephone to assist a detainee in seeking assistance from such service providers. However, such lists are often ineffective because the particular service provider may be temporarily unavailable (e.g., in court or assisting another client), may not be interested in the particular case (e.g., does not handle felony cases, the bond amount is excessive, etcetera), or may currently be accepting no new cases (e.g., temporarily assisting clients at capacity). Accordingly, a detainee may be required to make many calls to obtain assistance from one or more service providers. Even when a service provider can be reached who is interested in taking the case, considerable information must typically be exchanged, such as the detainee's personal information, the reason for being detained, arraignment or other court dates, the terms of bail, identification of a friend or family member providing funds for bail, etcetera. The detainee may not have all of the necessary information. Accordingly, considerable time and effort may be required in order for a detainee to obtain assistance from a service provider.

Similarly, a detainee may have difficulty reaching a friend or family member for assistance. For example, a selected friend or family member may be temporarily away from home, be in a meeting, etcetera. Accordingly, a detainee may be required to make many calls to reach one or more friends or family members. Even when a friend or family member can be reached, the individual may be unable to provide the desired assistance. For example, the friend or family member may be unable to supply funds in the amount necessary for the detainee to bond out of the inmate facility. Accordingly, considerable time and effort may be required in order for a detainee to obtain assistance from a friend or family member.

The communications necessary to obtain assistance may be further delayed by a need of various persons attempting to assist the detainee to communicate. For example, a bail bondsman may need to communicate directly with a friend or family member of the detainee who has agreed to supply funds for the detainee to bond out of the inmate facility. Establishing communications between the detainee and the service provider, the detainee and the friend or family member, and the service provider and the friend or family member in order to exchange all the necessary information can require additional time and effort in association with a detainee obtaining assistance.

During the time a detainee is awaiting further processing at the inmate facility, staff of the inmate facility may be called upon numerous times to supply information about the detainee. For example, the detainee may request information regarding their arraignment date, the reasons for their incarceration, the terms of bail, etcetera in order to provide such information to a service provider, such as an attorney or bail bondsman. Service providers may request information about a detainee from the staff, such as to confirm information provided by the detainee and/or to obtain all the information necessary to provide the desired services to the detainee. Friends and family of the detainee may request information, such as general status information, information regarding possible service providers, etcetera, from staff of the inmate facility.

If a detainee is able to secure assistance from the proper service providers and/or friends or family members before the detainee has been further processed to be housed in the inmate facility as an inmate, issues with respect to overcrowding within the inmate facility can be avoided and the inmate facility is spared expenses, such as those associated with classifying the detainee, providing a medical examination, having staff input detailed information into an inmate management system, etcetera. Moreover, a detainee which otherwise need not be provided housing within the inmate facility attains the desired release. Unfortunately, the processes and systems typically in place with respect to a detainee's processing into an inmate facility often do not result in a detainee being able to secure assistance from the proper service providers and/or friends or family members before the detainee has been further processed to be housed in the inmate facility as an inmate.

BRIEF SUMMARY OF THE INVENTION

The present invention is directed to systems and methods which provide assistance with respect to or in association with individuals such as a detainee at an inmate facility. Embodiments of the invention facilitate booking, bonding, and release in association with an inmate facility by providing assistance with respect to a detainee communicating with service providers, friends and family, etcetera. Additionally or alternatively, embodiments of the invention facilitate booking, bonding, and release in association with an inmate facility by providing assistance with respect to one or more service providers and/or friends and family members of the detainee in their efforts to assist a detainee.

For example, an embodiment of the invention may facilitate particular detainees, such first time offenders, detainees accused of certain offenses, etcetera, completing paperwork, payment, and the like for expediting their release. According to one embodiment, a self-service terminal, such as a kiosk, is provided for such detainees to have bail amounts established and to accept payment of bail amounts, such as by credit card, cash, or check, to allow self-service processing of the detainee. Additionally or alternatively, such a self-service terminal, or an additional self-service terminal, may be provided for expediting the processing and/or release of other detainees. For example, a self-service kiosk, booking officer terminal, and/or other system may collect information needed by a service provider, such as an attorney or bail bondsman, to expedite their providing a service to the detainee, such as where the detainee is not eligible for full self-service processing.

Embodiments of the invention facilitate communication between a detainee and an appropriate service provider, such as an attorney or bail bondsman, by identifying potential service providers, prequalifying the detainee (e.g., verifying that the detainee meets some minimum credit or other risk threshold, determining that the detainee's case meets criteria of a potential service provider, confirming that a potential service provider is accepting cases, etcetera), collecting information useful to the service provider, and/or establishing communications between the detainee and service provider, preferably providing collected information to the service provider. Similarly, embodiments of the invention facilitate communication between a detainee and a friend or family member by collecting information useful to the friend or family member and/or establishing communications between the detainee and friend or family member, preferably providing collected information to the friend or family member. Embodiments of the invention facilitate communication between a detainee and other parties interested in the booking, bonding, and/or release of the detainee, such as a judge, court clerk, police officer, etcetera. For example, a self-service kiosk or other user terminal may include a multimedia interface to provide video conferencing, such as for a video arraignment where the detainee is not eligible for bail without an appearance before a judge.

Communications established according to embodiments of the invention may comprise real-time voice, video, and/or text, may comprise delivery of delayed voice, video, and/or text, or combinations thereof. Accordingly, a detainee, a service provider, and a friend or family member may use any of a number of communications devices, such as a telephone (wireless or wireline), a video phone, a personal digital assistant, a pager, a communication kiosk, and a computer, for communication according to embodiments of the invention. A detainee, a service provider, and a friend or family member communicating according to embodiments of the invention may use different communication device configurations, with a portal or other node providing a gateway therebetween.

Communications may be provided with and between individuals and nodes other than the aforementioned detainees, service providers, and friends and family. For example, staff of an inmate facility, court personnel, police department personnel, etcetera may be provided communications according to embodiments of the invention. Additionally or alternatively, a communication node need not be associated with an individual. For example, various databases, servers, data processing systems, etcetera may be provided communications according to embodiments of the invention. An embodiment of the invention communicates with a bank system, such as a credit card authorization center or clearing house, to allow a detainee to use a credit card, debit card, check-by-phone, or other payment technique in posting bail or in making payment to a service provider, such as an attorney or bail bondsman.

Embodiments of the invention facilitate communications between appropriate combinations of individuals and resources. For example, a detainee may be placed in communication with a bail bondsman who requires information from a friend or family member of the detainee acting as a surety. Multi-way, e.g., three-way, communication may be established by systems of the present invention to facilitate the persons involved in the communication obtaining the information needed. Such communications may not be fully bridged, such as to prevent a first party from communicating with a second party, although allowing a third party to have full duplex communications with the first and second parties. Multi-way communication need not be with respect to individuals only according to embodiments of the invention. For example, two parties in communication may be placed in communication with a database or interactive voice response system to provide access to needed information.

Embodiments of the invention may utilize a communication portal to facilitate communications. Such a communications portal may provide functionality in addition to establishing communications, such as call accounting/logging, call detail record creation, call recording, message delivery, automated response, memo recording, etcetera. Service provider functionality may be provided, such as by a service provider module in communication with the communication portal, to identify potential service providers, to collect information useful to service providers, to manage communications between multiple parties as needed to provide a service, to present a user friendly interface to service providers, etcetera. Similarly, detainee functionality may be provided, such as by a detainee module in communication with the communication portal, to manage communications associated with each detainee, to present a user friendly interface to detainees, etcetera. Additional or alternative functionality may include information management functionality, such as by an information management module in communication with the portal, payment processing functionality, such as by a payment processing module in communication with the portal, validation/risk assessment functionality, such as by a validation/risk assessment module in communication with the portal, etcetera.

A preferred embodiment of the invention implements profiles (e.g., service provider profiles, detainee profiles, and/or risk profiles) with respect to the foregoing functionality. For example, a service provider profile may be utilized to determine which service providers handle a particular type of case, a threshold requirement or requirements for a service provider accepting a client, what information is needed by a service provider, one or more ways to establish communications with a service provider, etcetera. A detainee profile may be utilized to determine a detainee's preferences with respect to service providers, personal information of the detainee, contact information for a detainee's friends or family members, detainee account information, etcetera. A detainee profile may additionally or alternatively include assistance information, such as information with respect to the types of services that should be provided and/or offered to the detainee, how the detainee is to be processed, etcetera. A risk profile may be utilized to determine a level of risk associated with a detainee, a friend or family member, a particular case, etcetera.

Assistance provided according to embodiments of the invention is not limited to assistance provided directly to a detainee. For example, a service provider, such as an attorney or bail bondsman, may be provided assistance in collecting information useful in providing a desired service to the detainee. Police department personnel may be provided assistance in investigating a detainee and/or a case. Staff of an inmate facility may be provided assistance in processing the detainee.

According to embodiments of the invention, processing detainee information is automated to solicit appropriate information and populate one or more databases, such as a facility management database of an information management module, a call processing database of a communication portal, a detainee profile of a detainee module, etcetera, to streamline detainee processing by staff of the inmate facility. Such streamlined detainee processing may provide further advantages, such as creating detainee records for immediate accounting/logging, recording, etcetera. Establishing detainee records substantially immediately upon entry of the detainee into the inmate facility may be utilized to provide advantages, such as logging of calls made by the detainee (as may be useful in establishing that the detainee was given one or more calls as may be required by law and/or limiting a number of calls made by a detainee), recording of calls (as may be useful to an investigator in obtaining information about a crime which might otherwise be lost), charging for calls which are not otherwise required to be given without charge (as may be useful to deter abuse or misuse of the communication system), etcetera.

Assistance provided by embodiments of the invention facilitates a detainee securing assistance from the proper service providers and/or friends or family members with minimal effort and in a timely manner, such as prior to the detainee being further processed to be housed in the inmate facility as an inmate. Moreover, assistance provided by embodiments of the invention facilitates optimizing the level of self-service and automated steps that are invoked with respect to a detainee. Accordingly, embodiments of the present invention alleviate issues with respect to overcrowding within the inmate facility and the inmate facility is spared expenses, such as those associated with classifying the detainee, providing a medical examination, having staff input detailed information into an inmate management system, etcetera.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 shows an exemplary flow with respect to operation of the inmate facility assistance system of FIG. 1 according to an embodiment of the present invention; and FIG. 3 shows a processor-based system configured to provide operation of an inmate facility assistance system of embodiments of the present invention.

DETAILED DESCRIPTION OF THE INVENTION

Figure 1:
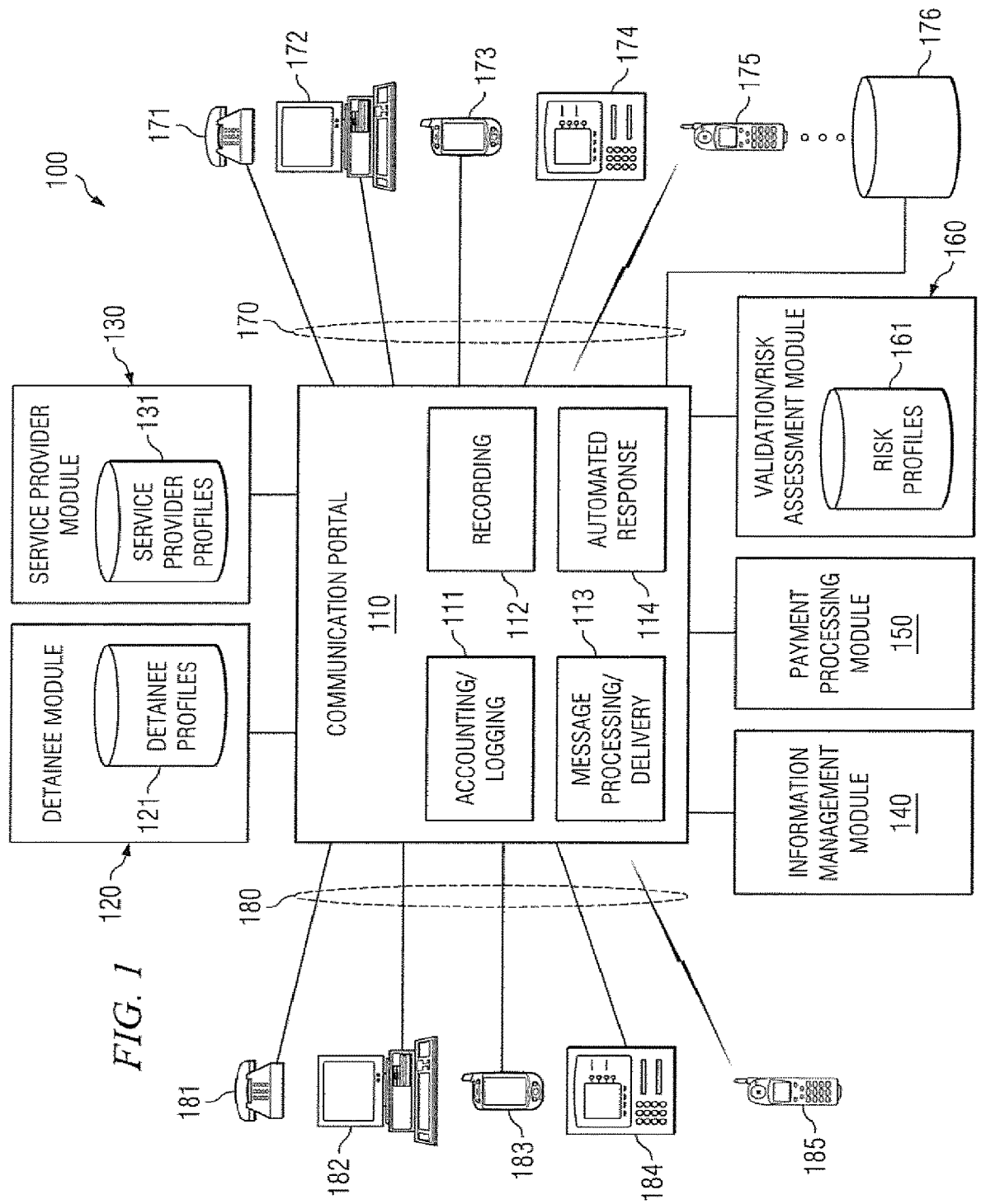
FIG. 1 shows a high level block diagram of an inmate facility assistance system adapted according to an embodiment of the present invention.

Directing attention to FIG. 1, inmate facility assistance system 100 adapted according to an embodiment of the invention is shown. Assistance provided by embodiments of inmate facility assistance system 100 facilitates detainees (including arrestees, prisoners, and inmates, collectively referred to as residents) securing assistance with respect to their stay at an inmate facility from the proper service providers and/or friends or family members. Moreover, embodiments of inmate facility assistance system 100 provides assistance to service providers, such as attorneys and bail bondsmen, police department personnel, friends and family of detainees, staff of an inmate facility associated with inmate facility assistance system 100, and/or other individuals or entities which are not detainees.

Inmate facility assistance system 100 of the illustrated embodiment includes communication portal 110 providing communication between various ones of nodes 171-176 and 181-185. Nodes 181-185 may, for example, be disposed within an inmate facility associated with inmate facility assistance system 100. Correspondingly, nodes 171-176 may be disposed outside of an inmate facility associated with inmate facility assistance system 100. Irrespective of their locations, nodes 171-176 and 181-185 may comprise any of a number of communication nodes, information processing systems, and user interfaces, using any of a number of media. For example, nodes 171-176 and 181-185 may comprise one or more of a telephone (e.g., nodes 171 and 181), a computer (e.g., nodes 172 and 182), a personal digital assistant (e.g., nodes 173 and 183), a self-service kiosk (e.g., nodes 174 and 184), a cellular phone (e.g., nodes 175 and 185), a database or other information processing system (e.g., node 176), or the like.

Communication portal 110 of the illustrated embodiment is in communication with nodes 171-176 via links 170 and with nodes 181-185 via links 180. Links 170 and 180 may comprise any of a number of links suitable for communication by and between nodes 171-176, nodes 181-185, and communication portal 110. Links 170 and 180 of embodiments of the invention may comprise one or more of a personal area network (PAN), local area network (LAN), metropolitan area network (MAN), wide area network (WAN), wireless LAN (WLAN), Internet, intranet, extranet, public switched telephone network (PSTN), cellular telephone network, cable transmission system, satellite transmission system, and/or the like.

Communications established according to embodiments of the invention may comprise real-time voice, video, still image, and/or text, may comprise delivery of delayed voice, video, still image, and/or text, or combinations thereof. Moreover, embodiments of the invention provide communication gateway functionality to facilitate communications between nodes having differing communication capabilities. For example, voice communication received from a telephone (e.g., one of nodes 171 and 181) or a cellular phone (e.g., nodes 175 and 185) may be converted by message processing/delivery 113 of communication portal 110 to an e-mail or short message service (SMS) message, such as by using a speech to text feature thereof, for delivery to a pager (not shown), PDA (e.g., one of nodes 173 and 183), or computer (e.g., one of nodes 172 and 182) according to embodiments of the invention. Similarly, text communication received from a pager (not shown), PDA (e.g., one of nodes 173 and 183), or computer (e.g., one of nodes 172 and 182) may be converted by message processing/delivery 113 of communication portal 110 to a voice message, such as by using a text to speech feature thereof, for delivery to a telephone (e.g., one of nodes 171 and 181) or a cellular phone (e.g., nodes 175 and 185).

As may be appreciated from the foregoing, communication portal 110 of embodiments of the invention comprises one or more components for providing operation as described herein. Communication portal 110 of the illustrated embodiment comprises accounting/logging 111, recording 112, message processing/delivery 113, and automated response 114, such as may comprise program code and/or circuits to provide the described operations.

Accounting/logging 111 of a preferred embodiment provides accounting for communication sessions. For example, accounting/logging 111 may provide call rating, call accounting, toll assessment, message bit count accounting, bandwidth utilization accounting, and/or call detail record creation. Additionally or alternatively, accounting/logging 111 of embodiments provides logging of communication sessions. For example, accounting/logging 111 may provide logging of individuals attempting to establish communications, individuals successful in establishing communications, the particular phone numbers or other electronic addresses associated with attempted communications, the particular phone numbers or other electronic addresses associated with communications which were successfully established, and/or individuals reached through successful communications. Accounting/logging 111 of embodiments of the invention creates and/or manages call detail records, such as may include time of communication, duration of communication, inmate facility name, detainee identification, called and calling addresses (e.g., phone numbers, internet protocol addresses, media access control addresses, terminal electronic serial numbers, etcetera), and/or the like. Any of the foregoing information may be associated with other relevant information, such as a recording of the communication session, a memo created by one of the parties in association with the communication session, etcetera.

Recording 112 of a preferred embodiment provides recording of communication sessions. For example, recording 112 may record all or selected voice communications made via communication portal 110. Additionally or alternatively, recording 112 may retain a copy of all or selected text communications made via communication portal 110. Embodiments utilize recording 112 to facilitate memo creation or note taking in association with assistance provided in accordance with the invention. For example, a service provider such as a bail bondsman or attorney may dictate a memo in association with a communication after communicating with a detainee but prior to disconnecting from inmate facility assistance system 100. Such a memo may be associated with other relevant data available from and/or through inmate facility assistance system 100, such as a recording of the communication, detainee information, call detail records, etcetera, and provided to the service provider and/or others in various formats, such as multi-media electronic files, hard copy printouts, and/or the like. It should be appreciated that memo and notes may be made at any time according to embodiments of the invention. For example, a service provider may "bookmark" particular portions of a communication in real-time, such as by pressing an appropriate dual-tone multi-frequency (DTMF) key during a telephone conversation, for later reference.

Message processing/delivery 113 of a preferred embodiment provides processing of messages of communication sessions. For example, message processing/delivery 113 of embodiments provides session management to facilitate establishing and maintaining communication links in real-time between parties, including establishing multi-way communication links where appropriate (e.g., as may be validation/risk assessment module 160). Message processing/delivery 113 may provide formatting of messages and/or gateway functionality, as described above, to facilitate communications. Additionally or alternatively, message processing/delivery 113 of embodiments provides message delivery services, such as scheduling delayed message delivery, multiple message delivery attempts (whether to a same electronic address or to multiple electronic addresses), message broadcasting, and/or message recipient hunting (whether to multiple electronic addresses serially or in parallel).

Automated response 114 of a preferred embodiment provides automated interaction with users of communication portal 110 to facilitate desired operation. For example, automated response 114 may provide interactive response with a user attempting to establish communications, such as through the use of an interactive voice response (IVR) program, to facilitate the communications, to assist in identifying a service provider or other party to direct the communication to, and/or to solicit information useful with respect to the communication. Additionally or alternatively, automated response 114 of embodiments provides interactive response with a user attempting to obtain information so as to provide desired information.

In addition to the aforementioned communication portal and nodes, inmate facility assistance system 100 of the illustrated embodiment comprises a plurality of functional modules operable in cooperation with the communication portal and nodes to provide assistance as described herein. Specifically, the illustrated embodiment of inmate facility assistance system 100 includes detainee module 120, service provider module 130, information management module 140, payment processing module 150, and validation/risk assessment module 160 coupled to communication portal 110.

Detainee module 120 of embodiments of the invention manages information associated with detainees of an inmate facility associated with inmate facility assistance system 100. For example, detainee module 120 may collect personal information with respect to detainees, such as name, age, social security number, address, financial or credit history, medical conditions, medications currently being taken, etcetera. Detainee module 120 may additionally or alternatively collect information associated with the detainee's incarceration in an inmate facility associated with inmate facility assistance system 100, such as a reason for arrest, bail amount, etcetera. Embodiments of detainee module 120 collect additional information useful in providing assistance to detainees, such as names and contact information of friends and family, arraignment or other court dates, names and contact information of officers or other officials in charge of a detainee's case, and/or the like. Detainee module 120 may compile detainee profiles (shown as detainee profiles 121) corresponding to particular detainees to associate appropriate information with detainees. Detainee profiles may be utilized by inmate facility assistance system 100 in providing assistance to an associated detainee, such as through indicating what services should be made available to the detainee, indicating how the detainee is to be processed, identifying particular service providers that may be of assistance to the detainee, establishing and/or managing communications with friends and family of the detainee, disseminating information regarding the detainee to friends and family, reminding the detainee of court dates and/or other appointments, etcetera. Additionally or alternatively, detainee profiles may be utilized by inmate facility assistance system 100 in providing assistance to individuals and entities other than detainees, such as to provide needed information to service providers assisting a detainee. Detainee profiles may be utilized in providing operation as shown and described in the above referenced patent application entitled "Systems and Methods for Management and Dissemination of Information for Controlled Environment Facility."

The foregoing information may be collected automatically by communication portal 110, such as through interaction with various functional modules and/or databases containing such information, through monitoring communications made via communication portal 110, and/or through soliciting information from various entities and individuals. The foregoing information may be input manually into communication portal 110, such as through a detainee inputting profile information using one or more of nodes 181-185, through inmate facility staff inputting profile information using one or more of nodes 181-185 and/or, through individuals or entities (e.g., friends or family, police officers, court personnel, etcetera) inputting profile information using one or more of nodes 171-175.

Service provider module 130 of embodiments of the invention manages information associated with service providers which provide services to detainees of an inmate facility associated with inmate facility assistance system 100. For example, service provider module 130 may collect general information with respect to service providers, such as name, contact information, services offered, fees charged, forms of payment accepted, hours of availability, etcetera. Service provider module 130 may additionally or alternatively collect information associated with the service provider's preferences, such as types of cases accepted, types of clients accepted, threshold client credit score or other rating, etcetera. Service provider module 130 may compile service provider profiles (shown as service provider profiles 131) corresponding to particular service providers to associate appropriate information with service providers. Service provider profiles may be utilized by inmate facility assistance system 100 in providing assistance to detainees, such as through providing information useful in selecting a service provider for assisting the detainee, prequalifying a detainee for the services of particular service providers that may be of assistance to the detainee, etcetera. Additionally or alternatively, service provider profiles may be utilized by inmate facility assistance system 100 in providing assistance to individuals and entities other than detainees, such as to provide only prequalified detainees to service providers, collecting appropriate information from the detainee for a particular service provider once the detainee has been prequalified and selects that service provider for services. Service provider profiles may be utilized in providing operation as shown and described in the above referenced patent application entitled "Systems and Methods for Management and Dissemination of Information for Controlled Environment Facility."

The foregoing information may be collected automatically by communication portal 110, such as through interaction with various functional modules and/or databases containing such information, through monitoring communications made via communication portal 110, and/or through soliciting information from various entities and individuals. The foregoing information may be input manually into communication portal 110, such as through a service provider inputting profile information using one or more of nodes 171-175, through inmate facility staff inputting profile information using one or more of nodes 181-185, and/or through individuals or entities (e.g., service bureau personnel, etcetera) inputting profile information using one or more of nodes 171-175.

Information management module 140 of embodiments of the invention manages information associated with one or more inmate facility associated with inmate facility assistance system 100. For example, information management module 140 may collect, aggregate, and/or analyze various investigative information utilized by investigators in solving and/or preventing crimes. Additionally or alternatively, information management module 140 may manage information associated with transaction processing, such as may be associated with a commissary system or call processing system of inmate facility assistance system 100. Further detail with respect to information management as may be provided by information management module 140 is provided in the above referenced patent applications entitled "Information Management and Movement System and Method," "System and Method for Transaction and Information Management," and "Systems and Methods for Acquiring, Accessing, and Analyzing Investigative Information."

Payment processing module 150 of embodiments of the invention processes payments associated with one or more inmate facility associated with inmate facility assistance system 100. For example, payment processing module 150 may facilitate collection of funds via credit card, debit card, check-by-phone, prepaid account, post paid account, cash, electronic funds transfer (EFT), etcetera. Payment processing module 150 of embodiments of the invention may establish accounts for detainees, such as by accepting prepayment from friends or family, by a detainee depositing cash or other payment (e.g., through the use of a self-service kiosk such as node 184), by establishing a post-paid or credit account, etcetera. Further detail with respect to payment processing as may be provided by payment processing module 150 is provided in the above referenced patent applications entitled "Information Management and Movement System and Method," "System and Method for Transaction and Information Management," "Systems and Methods for Transaction and Information Management," and "System and Method for Account Establishment and Transaction Management using Interrupt Messaging."

Validation/risk assessment module 160 of embodiments of the invention provides validation for transactions, such as communication attempts. For example, validation/risk assessment module 160 may operate to validate that a detainee has not already taken advantage of all free communications to be afforded thereto, that a detainee has sufficient funds available to pay for a communication session or other transaction, that a detainee has sufficient funds available to pay for the services of a service provider, etcetera prior to inmate facility assistance system 100 allowing further processing with respect to a particular transaction. Additionally or alternatively, validation/risk assessment module 160 of embodiments provides assessment of risk associated with individuals, entities, and/or transactions. For example, validation/risk assessment module 160 may analyze a detainee's credit history, the reason for the detainee's incarceration, the particular inmate facility incarcerating the detainee, the address of the detainee, the address of friends or family of the detainee, the credit history of friends or family of the detainee, and/or the like in order to provide a risk assessment metric, such as may be used in extending credit to the detainee, prequalifying the detainee for services of a service provider, etcetera. According to the illustrated embodiment, various information associated with a detainee is compared to one or more risk assessment profiles (e.g., risk profiles 161) to provide a risk assessment metric based upon empirical, statistical, or other predetermined characteristics. Validation/risk assessment module 160 may make communication and/or transaction enabling/blocking determinations, such as to determine if a detainee is permitted to access a particular service (such as based upon reason for incarceration, past criminal record, credit history, etcetera), to determine if a multi-way communication is allowed in a particular circumstance (such as when a detainee is in communication with a service provider and a friend or family member is to be added to the communication), etcetera. Further detail with respect to validation and risk assessment as may be provided by validation/risk assessment module 160 is provided in the above referenced patent applications entitled "Optimizing Profitability in Business Transactions" and "Systems and Methods for Transaction Authorization Determination."

Inmate facility assistance system 100 may be disposed in various topologies and configurations. For example, communication portal 110, including any or all of functional modules 120-160, and nodes 181-185 may be disposed within an inmate facility associated with inmate facility assistance system 100, whereas nodes 171-176 are disposed outside of the inmate facility, thereby providing a local inmate facility assistance system configuration. Alternatively, communication portal 110, including any or all of functional modules 120-160, and nodes 171-176 may be disposed outside of an inmate facility associated with inmate facility assistance system 100, whereas nodes 181-185 are disposed inside of the inmate facility, thereby providing a centralized inmate facility assistance system configuration. It should be appreciated that various ones of functional modules 120-160, as well as various aspects of communication portal 110 itself, may be disposed remotely with respect to communication portal 110 according to embodiments of the invention. Additional detail with respect to local, centralized, and distributed system configurations providing services to controlled environment facilities, such as an inmate facility, is provided in the above referenced patent applications entitled "Information Management and Movement System and Method," "System and Method for Transaction and Information Management," "Systems and Methods for Transaction and Information Management," and "Centralized Call Processing."

Having described inmate facility assistance system 100 of embodiments of the present invention above, operation thereof according various exemplary embodiments will be described below with reference to FIG. 2 in order to aid in the understanding of the concepts of the present invention. Specifically, FIG. 2 illustrates an exemplary flow with respect to operation of inmate facility assistance system 100 according to an embodiment of the present invention.

At block 201 of the embodiment illustrated in FIG. 2 one or more service provider profiles 131 of FIG. 1 are created in preparation for providing assistance to detainees. For example, an attorney wishing to be considered for providing services to detainees of an inmate facility associated with inmate facility assistance system 100 may input information such as contact name, contact number, types of services performed, types of cases handled, hourly rates, hours of availability, methods of payment accepted, the types of information needed to engage representation, etcetera, as may be disseminated to detainees or others seeking the assistance of an attorney. Additionally or alternatively, the attorney may input information such as threshold risk scores for accepting a client, types of cases handled, particular inmate facilities served, etcetera, as may be used by inmate facility assistance system 100 in identifying potential attorneys for a particular detainee. The attorney may input information such as the types of information needed to engage representation, account numbers, bar membership number, etcetera to facilitate inmate facility assistance system 100 automatically providing needed information to the attorney, making payments to the attorney, completing forms or paperwork for filing (e.g., electronically or in paper form), etcetera.

A bail bondsman wishing to be considered for providing services to detainees of an inmate facility associated with inmate facility assistance system 100 may input information such as contact name, contact number, types of services performed, types of cases handled, bonding minimums and maximums, rates for bonding, hours of availability, methods of payment accepted, the types of information needed to engage representation, etcetera, as may be disseminated to detainees or others seeking the assistance of a bail bondsman. Additionally or alternatively, the bail bondsman may input information such as threshold risk scores for accepting a client, types of cases handled, particular inmate facilities served, etcetera, as may be used by inmate facility assistance system 100 in identifying potential bail bondsmen for a particular detainee. The bail bondsman may input information such as the types of information needed to engage representation, account numbers, state licensing number, etcetera to facilitate inmate facility assistance system 100 automatically providing needed information to the bail bondsman, making payments to the bail bondsman, completing forms or paperwork for filing (e.g., electronically or in paper form), etcetera.

The foregoing information may be input by the respective service providers, or their representatives, such as via one or more of nodes 171-175 and nodes 181-185 of FIG. 1. Additionally or alternatively, inmate facility personnel or other personnel associated with inmate facility assistance system 100 may input the foregoing information, such as via one or more of nodes 171-175 and nodes 181-185. Moreover, some or all of the foregoing information may be gathered from existing sources, such as within one or more databases of node 176 (e.g., service provider computer system databases, telephone listing databases, government record databases, etcetera).

It should be appreciated that inclusion of a particular service provider or the level of service provided with respect to a particular service provider by inmate facility assistance system 100 may be determined through a subscription or participation fee. For example, an owner or operator of inmate facility assistance system 100 may only include basic information, such as name, type of service, and contact information, for service providers not having paid a participation fee, whereas service providers having paid a participation fee may have any or all of the foregoing information included and thus have attendant assistance services provided by inmate facility assistance system 100 (e.g., multiple levels of participation may be available on a graduated fee structure). The foregoing participation fees may be predetermined one-time or periodic fees or may be a portion (e.g., percentage or predetermined fee) of the transaction revenues facilitated using inmate facility assistance system 100.

At block 202 of the illustrated embodiment police collect information associated with a detainee. For example, police may arrest a detainee on an outstanding warrant or for the commission of an offense, collecting some initial information from the detainee, or others as part of an investigation, etcetera. Such information may include the detainee's name and other personal information, the reason for arresting the detainee, an accounting of money and other items in the detainee's possession at the time of arrest, a case number, identification of an arresting officer, identification of an investigator or other personnel assigned to the detainee's case, and/or the like. According to preferred embodiments of the invention, police or other officials enter some or all of the foregoing initial information directly into inmate facility assistance system 100 (e.g., into detainee module 120 and/or information management module 140), such as via one or more nodes (e.g., nodes 171-175) in communication with communication portal 110. Additionally or alternatively, some or all of the foregoing initial information may be entered into inmate facility assistance system 100 by personnel other than the police, such as inmate facility staff, court personnel, etcetera via one or more nodes (e.g., nodes 171-175 and 181-185). Some or all of the foregoing information may additionally or alternatively be gathered from existing sources, such as within one or more databases of node 176 (e.g., public record databases, telephone listing databases, government record databases, etcetera). The foregoing information may be associated with additional information, such as prior arrest history, credit history, etcetera, as may be available through a database or other information processing system (e.g., node 176) in communication with inmate facility assistance system 100.

At block 203 of the illustrated embodiment the detainee is initially processed at an inmate facility associated with inmate facility assistance system 100. For example, the detainee may be photographed, fingerprinted, and entered into an inmate facility management system of information module 140, such as the JUSTICE APPLICATIONS MANAGER available from Evercom Systems, Inc. Initial processing of the detainee may comprise inputting information such as the detainee's name and other personal information, the reason for detaining the detainee, an accounting of money and other items in the detainee's possession at the time of introduction to the inmate facility, a case number, identification of an arresting officer, identification of an investigator or other personnel assigned to the detainee's case, terms for release from detention (e.g., bail amount, acceptable types of bonds, etcetera), and/or the like. It should be appreciated that some of the foregoing information input with respect to initial processing of the detainee at the inmate facility may be input by an arresting officer or other personnel at block 202. Accordingly, where the initial information input at block 202 is robust, much of the information utilized in initially processing the detainee at the inmate facility may already be present in inmate facility assistance system 100, thereby assisting inmate facility personnel in completing initial processing of the detainee.

A detainee may input initial information at block 203, such as via one or more of nodes 181-185 to assist inmate facility personnel in completing initial processing of the detainee. For example, a detainee may input personal information, friends and family contact information, attorney contact information, etcetera. A detainee may provide biometric information, such as a fingerprint, a voice sample, a still or video image, an iris or retinal scan, a DNA sample, and/or the like, such as may be used in identifying the detainee to inmate facility assistance system 100 and/or personnel of the inmate facility. Such biometric information may be used when the detainee accesses a node of inmate facility assistance system 100, when identifying the detainee for records searches (such as for prior arrest history), when being released (such as after self-service processing), and when being accepted into the inmate facility to be housed.

The forgoing information regarding the detainee may be utilized in creating a detainee profile. The information may be utilized to determine a detainee's preferences with respect to service providers, personal information of the detainee, contact information for a detainee's friends or family members, detainee account information, etcetera. The information may additionally or alternatively be used in determining the types of services that should be provided and/or offered to the detainee, how the detainee is to be processed, etcetera.

For example, based upon a detainee's current reason for being detained, prior arrest history, and credit history or monies present on the individual when detained it may be determined that the detainee is eligible for full self-service bail processing (e.g., the detainee is eligible to access a self-service kiosk to complete release forms, pay a bail amount (such as may be preset for minor offenses) by credit card, cash, or check). Based upon a detainee's current reason for being detained, prior arrest history, and a level of risk associated with the detainee it may be determined that the detainee is eligible for partial self-service bail processing (e.g., the detainee is eligible to access a self-service kiosk or communication terminal to contact one or more service providers (such as an attorney and bail bondsman), to schedule and/or conduct an arraignment (such as a video arraignment), etcetera) in order to arrange the detainee's release. Similarly, based upon a detainee's current reason for being detained, prior arrest history, and a level of risk associated with the detainee it may be determined that the detainee is ineligible for any level of self-service bail processing because the reason for being detained is a serious offense, the detainee's prior arrest record prevents expedited release, a level of risk associated with the detainee is too great, etcetera. Such a detainee may still be provided some level of assistance according to embodiments of the present invention, such as to communicate with friends and family, communicate with service providers, input information useful in obtaining release, etcetera, although the detainee may not be able to obtain an expedited release.

The above information regarding the detainee may be utilized alone or in combination with other information in creating a risk profile for determining a level of risk associated with a detainee, a friend or family member, a particular case, etcetera. For example, detainee information may be used to access credit history information, prior arrest information, personal information (e.g., home ownership, family information, work information, etcetera), background check, and/or the like. Analysis of any or all of the foregoing information may be used in establishing risk levels in one or more areas, such as risk of payment for transactions/services, risk of flight from justice, risk of committing additional offenses, etcetera.

Preferred embodiments of the invention operate to substantially immediately create an account or logging record associated with a detainee as that detainee is initially processed at an inmate facility. For example, an account or logging record is created (e.g. by detainee module 120 or information management module 140) for each detainee and a personal identification number (PIN) issued (e.g. by detainee module 120 or information management module 140) during initial processing to identify the detainee with a corresponding logging record according to embodiments of the invention. Such a PIN may be used by the detainee to identify the detainee to inmate facility assistance system 100 (perhaps in combination with other information, such as a biometric sample) for receiving assistance, making phone calls, depositing/withdrawing money from an account, etcetera. According to one embodiment, a detainee is enabled to deposit money (e.g., cash on hand when the detainee is arrested) into an account created in association with the detainee, by inputting the foregoing PIN at a self-service kiosk, such as node 184, having a secure vault (e.g., having an automatic teller machine (ATM) type configuration) and inserting the money therein.

Some or all of the foregoing information may be stored as one or more detainee profiles 121 of FIG. 1 for providing assistance to detainees. Such detainee profiles may be utilized to determine a detainee's preferences with respect to service providers, personal information of the detainee, contact information for a detainee's friends or family members, detainee account information, etcetera.

The aforementioned PIN or other unique detainee identification is issued or otherwise associated with a detainee at an early point in their processing according to embodiments of the invention and preferably remains with the detainee at least until release, whether by expedited release or after housing within the inmate facility. By issuing a PIN early in the process, such as during initial booking, the detainee's calls during the booking period may be recorded and associated with the particular detainee, the calls may be properly restricted in number, the calls may be properly controlled in duration, and/or fees for the calls may be charged to the appropriate party where appropriate.

Initial processing of a detainee by inmate facility assistance system 100 may comprise processing in addition to entry of information, creation of accounts and/or logging records, and issuance of PINs or other unique identifiers as described above. For example, information management module 140 may operate to automatically populate appropriate databases with information associated with the detainee during initial processing.

Additionally or alternatively, validation/risk assessment module 160 of embodiments operates to utilize information input with respect to a detainee during initial processing with other information, such as that available from a public credit database (e.g., a database of node 176) and/or risk profile information (e.g., risk profiles 161), to determine one or more risk metric associated with the detainee. Such risk metrics may be utilized to indicate a credit risk level associated with the detainee, a risk level of flight (e.g., risk of defaulting on bail) associated with the detainee, a risk level of complicity in a crime for which the detainee has been arrested, etcetera. The foregoing risk metrics may be utilized by inmate facility assistance system 100 in prequalifying a detainee for the services of one or more service providers and/or by service providers or others in determining whether to offer a detainee services, what services to provide a detainee, types of payments and/or payment terms to accept from detainees, etcetera.

According to an embodiment of the invention, a financial or credit history database (e.g., a public credit reporting database of node 176) may be referenced by validation/risk assessment module 161, an account history (e.g., a utility service record, including date of establishing account, payment history, etcetera, available from node 176), demographic information associated with the detainee's address and/or other information provided by the detainee, etcetera may be utilized by validation/risk assessment module 160 in determining a credit risk metric. Information of national origin (e.g., available from a public database of node 176), having a valid passport (e.g., available from a government database of node 176), having family and/or friends residing outside of a particular jurisdiction (e.g., determined from information provided by the detainee), owning property within a particular jurisdiction (e.g., home ownership determined from a public database of node 176), etcetera may be utilized by validation/risk assessment module 160 in determining a flight risk metric. Information of prior criminal activity (e.g., available from a government database of node 176), information regarding the detainee's arrest (e.g., provided by an arresting officer), etcetera may be utilized by validation/risk assessment module 160 in determining a complicity risk.

Operation of the present invention is not limited to the particular risk metrics set forth above nor the particular information identified above in determining risk metrics. Moreover, there is no limitation to validation/risk assessment module 160 of embodiments providing risk assessments with respect to detainees. For example, validation/risk assessment module 160 may provide risk assessment (e.g., credit risk assessment) with respect to friends and family of a detainee for use by service providers providing services to a detainee at the expense of a detainee's friend or family member. The above referenced patent applications entitled "Optimizing Profitability in Business Transactions," "Systems and Methods for Transaction Authorization Determination," and "Systems and Methods for Transaction and Information Management" provide detail with respect to risk assessment and/or providing risk metrics as may be implemented with respect to various individuals and situations according to embodiments of the present invention.

It should be appreciated that, at this point in the flow of FIG. 2, the detainee has not been fully processed into the inmate facility (e.g., the detainee is not "housed" at the inmate facility or is not an "inmate" of the inmate facility). For example, inmate facility personnel may yet need to classify the detainee, perform a medical examination and/or hygienic processing of the detainee, and complete a detailed file in the inmate facility management system for the detainee before that detainee is housed and thus becomes an inmate of the inmate facility. Accordingly, at block 204 the detainee is placed in a holding cell or area pending further processing of the detainee.

Often the law requires that a detainee be given access to a telephone for placing one or more calls, whether free or for charge, to seek assistance from someone outside of the inmate facility, such as a friend or family member, an attorney, a bail bondsman, etcetera. Accordingly, the holding cell in which the detainee is placed at block 204 may contain terminals for providing such communications, such as one or more of nodes 181-185. Such terminals are coupled to communication portal 110 according to embodiments of the invention to provide assistance to detainees, to personnel of the inmate facility, to service providers, and/or to friends and family of the detainees.

At block 205, the detainee utilizes one or more of nodes 181-185 to seek assistance or is otherwise provided assistance by operation of inmate facility assistance system 100. For example, a detainee may utilize one or more of nodes 181-185 to communicate with friends and family, service providers, and/or others associated with the detainee, to complete a detainee profile, to obtain detainee information, to deposit money into an account or make a payment, and/or the like.

In operation according to an embodiment of the invention, a detainee may be provided access to a telephone, such as node 181, and may attempt to initiate communications with a friend or family member to solicit assistance. For example, the detainee may be initially placed in communication with automated response 114, such as may comprise an IVR system, to solicit information from the detainee, such as identification information (e.g., voice print, fingerprint, PIN, etcetera) to associate the communication attempt with an account and/or log of accounting/logging 111, communication address or other communication information (e.g., the phone number of a called party), and/or the like.

Communication portal 110 may operate to determine if the attempted communication is to be completed, such as using the foregoing information to determine if the attempted communication is allowed (e.g., the detainee has not used a predetermined number of free communications, the called number is not a prohibited number, payment for the communication service has been or can be collected, etcetera). Embodiments of the invention use functions of communication portal 110, such as accounting/logging 111, and/or functions external thereto, such as information management module 140 in determining if the detainee is allowed to communicate. For example, communication portal 110 may utilize validation/risk assessment module 160 to validate the detainee's account and/or a called party to determine if payment has been received (e.g., prepaid account) or can be collected (e.g., a billing arrangement exists with the called party's telephone service provider) before determining that the attempted communication is allowed.

If an attempted communication is not allowed or is otherwise not completed, embodiments of communication portal 110 may operate to assist the detainee in completing the communication or in identifying other features or functions useful to the detainee. For example, where the detainee does not possess sufficient funds to complete a toll call and the called number is not eligible for receiving a collect call, embodiments of the invention may employ techniques for accepting and processing payments, such as using payment processing module 150, and/or establishing an account for enabling completing the communication attempt, such as those shown and described in the above patent application entitled "System and Method for Account Establishment and Transaction Management Using Interrupt Messaging." Additionally or alternatively, where a detainee is unsuccessful in establishing communication with a called party (e.g., a ring, but no answer, a busy signal, etcetera), embodiments of the invention may employ message delivery techniques, such as those shown and described in the above patent application entitled "Called Party Controlled Message Delivery," using message processing/delivery 113.

Communication portal 110 of embodiments of the invention provides various functionality during a communication session in addition to facilitating the communications. For example, recording 112 may be utilized to record the content of communications, such as for use by an investigator as shown and described in the above referenced patent applications entitled "Information Management and Movement System and Method" and "Systems and Methods for Acquiring, Accessing, and Analyzing Investigative Information." Additionally or alternatively, accounting/logging 111 may be utilized to provide call accounting used in charging for communication services and/or to provide a log showing that a particular detainee received communications as may be required by the law. The aforementioned logs may not only provide a showing that a particular detainee took advantage of communication or other services, but may also provide detail with respect to the use of such services, such as to show a called number, a duration of the communications, etcetera.

Assistance provided to a detainee by inmate facility assistance system 100 of the illustrated embodiment is not limited to assistance with respect to communications to friends and family. For example, embodiments of the invention provide assistance with respect to a detainee seeking assistance from a service provider. In operation according to one embodiment, automated response 114 may query a detainee as to a type of service or service provider desired and identify a selection of service providers in response thereto. For example, a detainee may indicate that an attorney's services are desired and, through analysis of information regarding the detainee (e.g., from detainee profiles 121) and service providers (e.g., from service provider profiles 131), a plurality of potential attorneys providing services appropriate to the detainee may be identified. Analysis of information in identifying service providers may include determining that the detainee's case or situation matches those handled by the service provider, that the detainee qualifies for the services of the service provider, etcetera.

Assistance provided to a detainee with respect to service providers may include functions in addition to or in the alternative to identifying potential service providers. For example, communication portal 110 may operate to automatically establish communication between a detainee (e.g., using one or more of nodes 181-185) and a service provider (e.g., using one or more of nodes 171-175). Additionally or alternatively, communication portal 110 may operate to establish other communications relevant to a detainee obtaining assistance from a service provider. According to embodiments, communications to a friend or family member identified as a party willing to pay for the services of a service provider, or otherwise in need of communicating with a service provider, are established by communication portal 110. For example, communication portal 110 may establish a three-way or conference calling session between a detainee, a service provider, and a friend or family member in order to facilitate a detainee obtaining the services of the service provider. Embodiments may operate to collect and/or provide information to a service provider. For example, an appropriate service provider profile of service provider profiles 131 may be analyzed to determine information desired by a service provider. Such information may be collected from an appropriate detainee profile of detainee profiles 121, information management module 140, a database of node 176, etcetera. Likewise, risk assessment information, such as may be derived from risk profiles 161, and/or other data generated by inmate facility assistance system 100 may be provided to a service provider to facilitate assistance to a detainee.

Assistance provided to a detainee may include functions in addition to or in the alternative to communications services. For example, a detainee may utilize a user terminal (e.g., one or more of nodes 181-185) to input information, such as to complete a detainee profile of detainee profiles 121 in order that inmate facility assistance system 100 may better provide assistance to the detainee. Likewise, a detainee may utilize a user terminal (e.g., one or more of nodes 181-185) to obtain information from inmate facility assistance system 100, such as information regarding an arraignment or other legal proceeding date, information regarding an arresting officer or other personnel assigned to the detainee's case, information regarding service providers, information regarding services available to the detainee, etcetera.

Additionally or alternatively, user terminals, such as node 184, may provide a means, perhaps operable in cooperation with payment processing module 150, by which a detainee may deposit money (e.g., by inserting cash into a slot, swiping a credit card magnetic strip through a card reader slot, implementing an EFT transaction, etcetera) into an account (e.g., a prepaid account managed by inmate facility assistance system 100) and/or make a payment (e.g., pay a bail bondsman a bonding amount, pay an attorney a retainer, etcetera). Such payments may be handled on behalf of service providers (e.g., receiving a retainer amount for an attorney which is passed through to the attorney, receiving a bond payment for a bail bondsman which is passed through to the attorney, receiving a communication service fee which is passed through to a communication service provider, etcetera). A fee (e.g., preset transaction fee, percentage of the monies handled, etcetera) may be charged by an owner or operator of inmate facility assistance system 100 for handling such payments on behalf of service providers. Additionally or alternatively, an owner or operator of inmate facility assistance system 100 may collect such payments for their own benefit. For example, an owner or operator of inmate facility assistance system 100 may provide some services, such as calling services or bail bonding services (e.g., for minor offenses for which predetermined bail amounts are set and expedited release is automated), for which fees are collected directly, whereas other services are provided by other service providers and their associated fees passed through as described above.

At block 206, service providers utilize inmate facility assistance system 100 to provide assistance to detainees. For example, a service provider may utilize one or more of nodes 171-175 to communicate with a detainee, friends and family of a detainee, and/or others associated with the detainee, to complete a service provider profile, to obtain detainee information, to collect payment from a detainee, a friend, or family member, to complete and/or file paperwork on behalf of a detainee, and/or the like.

In operation according to an embodiment of the invention, a service provider may communicate with a detainee and/or friends or family of a detainee using a user terminal (e.g., one or more of nodes 171-175) coupled to communication portal 110. A service provider may complete a service provider profile of service provider profiles 131 in order to facilitate filtering of detainees referred to the service provider, such as through prequalification, criteria matching, etcetera. A service provider may additionally or alternatively obtain detainee information from inmate facility assistance system 100 useful in providing services to a detainee. For example, a service provider may obtain a risk metric associated with a detainee to determine if the service provider wishes to provide services to the detainee, to determine a fee schedule for the detainee, to determine a method of payment, etcetera. Payments to a service provider may be made by a detainee or friends and family using user terminals of inmate facility assistance system 100 (e.g., one or more of nodes 171-175 and 181-185) and processed using payment processing module 150. Paperwork and/or various filings (e.g., court filings, release documents, etcetera) may be made electronically by service providers, such as using information management module 140. Such paperwork and/or filings may be completed or partially completed for use by persons other than service providers, such as police personnel, court personnel, friends and family, the detainee, etcetera.

In operation according to embodiments of the invention, robust services are provided to service providers in order to facilitate their work with detainees. For example, communication services may be provided which hunt the service provider (e.g., attempt to initiate communications at various phone numbers to optimize the change of completing a call) in appropriate situations (e.g., where the communication is urgent, where a new prequalified detainee is seeking services, etcetera). The service provider may, therefore, be disposed somewhere that is not conducive to immediate follow-up or taking notes, although the service provider is free to communicate with the detainee or other individual. According to embodiments of the invention, after the communication terminates, the service provider may stay on the link with inmate facility assistance system 100 and is provided an IVR menu that provides an option of receiving a summary of the call detail, such as may be sent by electronic mail to the service provider, his assistant, etcetera. The service provider may additionally or alternatively be allowed to record one or more notes to himself or someone else. The aforementioned note(s) (e.g., a .wav file) may be associated with communication detail records (e.g., tie of call, duration of call, facility name, detainee identification, etcetera) and provided to the service provider, his assistant, or other individual (e.g., by electronic mail). Such an embodiment facilitates a service provider accurately billing for the services provided during the call, readily sharing information with colleagues or other individuals, and/or the like.

At block 207, friends and family utilize inmate facility assistance system 100 to provide assistance to detainees. For example, a friend or family member may utilize one or more of nodes 171-175 to communicate with a detainee, a service provider, and/or others associated with the detainee, to obtain detainee information, to make a payment on behalf of a detainee, to deposit money into a detainee account, and/or the like.

In operation according to an embodiment of the invention, a friend or family member may communicate with a detainee and/or a service provider using a user terminal (e.g., one or more of nodes 171-175) coupled to communication portal 110. A friend or family member may obtain detainee information from inmate facility assistance system 100 useful in providing assistance to a detainee. For example, a friend or family member may obtain information regarding an amount of bail to obtain release of a detainee, the terms of payment of bail, an arraignment date or other court information, etcetera. Payments to a service provider or a detainee's account may be made by a friend or family member using user terminals of inmate facility assistance system 100 (e.g., one or more of nodes 171-175) and processed using payment processing module 150.

It should be appreciated that the order of the various blocks described above with respect to FIG. 2 need not be in the particular order shown according to embodiments of the invention. For example, one or more of the blocks (e.g., blocks 205, 206, and 207) may be processed in a flow simultaneously. Moreover, one or more of the illustrated blocks may be omitted, combined, and/or modified according to embodiments of the invention. For example, an embodiment of the invention may operate to automatically notify appropriate service providers, such as a bail bondsman, of a detainee meeting particular criteria, such as to allow the service provider to preapprove or prequalify the detainee for services, to facilitate the service provider initiating communication with the detainee and/or friends and family of the detainee, etcetera. Such notification may occur before a detainee is placed in a holding cell, perhaps even before the detainee is initially processed at the inmate facility. For example, where an arresting officer utilizes a user terminal (e.g., one or more of nodes 171-175) to input information into inmate facility assistance system 100, notification to service providers and/or friends and family may begin before the detainee even reaches the inmate facility.

When implemented in software, the elements of embodiments of the present invention are essentially the code segments to provide operation as described above. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc.

FIG. 3 illustrates computer system 300, such as may comprise communication portal 110, detainee module 120, service provider module 130, information management module 140, payment processing module 150, and/or validation/risk assessment module 160 of inmate facility assistance system 100 of embodiments of the present invention. Central processing unit (CPU) 301 is coupled to system bus 302. The CPU 301 may be any general purpose CPU, such as an Intel PENTIUM processor. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 is also connected to printer 314, which would allow the system to print paper copies of information such as document, photographs, articles, etc. Note that the printer may be a printer (e.g. dot matrix, laser, etc.), a fax machine, or a copier machine. Communications card 311 is adapted to couple the computer system 300 to a network 312, which may comprise one or more of the PSTN, a PAN, a LAN, a WLAN, a MAN, WAN, the Internet, an intranet, an extranet, and/or the like, which may provide one or more of links 170 and 180. User interface card 308 couples user input devices, such as keyboard 313, pointing device 307, and microphone 316, to the computer system 300. User interface card 308 also provides sound output to a user via speaker(s) 315. The display card 309 is driven by CPU 301 to control the display on display device 310.

Operation according to embodiments described above provides an assistance environment in which a detainee may effectively obtain assistance in a self serve manner. Moreover, various individuals, such as service providers and friends and family are empowered to effectively assist detainees. In addition to providing assistance to detainees, embodiments of the invention provide assistance to individuals other than detainees. For example, friends and family are enabled to obtain desired information without impacting inmate facility personnel, thereby assisting both inmate facility personnel and the friends and family. Service providers are provided assistance in obtaining suitable or prequalified clientele, access to desired information, and/or completing and filing paperwork on behalf of a detainee.

Embodiments of the present invention operate to reduce the time for a detainee to receive assistance, and thus reduce the time a detainee otherwise eligible for release is detained. Accordingly, inmate facilities may utilize embodiments of inmate facility assistance system 100 to reduce their costs and/or issues with respect to overcrowding. Moreover, detainees are provided service heretofore unavailable. As such, embodiments of the present invention may qualify for certain inmate welfare/betterment programs, wherein funds are set aside for programs providing benefits to inmates. Often such funds are under utilized due to restrictions on their use and an inability to properly document the benefits received by the inmates. However, embodiments of inmate facility assistance system 100 may operate to self document such benefits, making such welfare/betterment funds readily available to inmate facilities implementing such a system.

Although embodiments have been described herein with reference to inmate facility controlled environments, it should be appreciated that concepts of the present invention are applicable to various environments. For example, embodiments of the present invention may be implemented to provide assistance with respect to detainees, residents, guests, occupants, etcetera of controlled environments such as hospitals, nursing homes, camps, and/or the like.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A detainee assistance system, comprising:
    a processor;
    a self-service kiosk including an interface for completing a level of self-service processing and a communication terminal to select and contact one or more service providers;
    a communication portal; and
    memory storing instructions that cause the processor to perform operations comprising:
        accepting data input by service providers, via the internet, to create and store one or more service provider profiles in the memory;
        accepting data input by law enforcement providers to create and store one or more detainee profiles in the memory;
        accessing one or more outside databases, via the internet, to obtain one or more risk metrics associated with each detainee;
        obtaining one or more risk metrics associated with each detainee from the detainee profile;
        creating risk profiles associated with the detainee profiles based on the risk metrics associated with each detainee, the detainee risk metrics comprising a current reason for being detained, prior arrest history, credit history, money in hand, and personal information;
        determining, from each detainee profile, a level of self-service processing for each detainee based upon the risk metrics, the level being either full or partial self-service bail processing;
        in response to a determination that the level of self-service processing is partial self-service bail processing:
            providing an initial real-time telephone communication between a service provider selected by the detainee;
            identifying, from each detainee profile, a third party associated with the detainee;
            accessing one or more outside databases, via the internet, to obtain one or more risk metrics associated with the third party;
            obtaining one or more risk metrics associated with the third party from the detainee's profile; and
            creating a risk profile associated with the third party based on the risk metrics associated with the third party, the third party risk metrics comprising credit history and personal information.

2. The system of claim 1, wherein, when based upon the detainee's current reason for being detained, prior arrest history, credit history, or money on hand, the level of self-service processing for a detainee is full self-service bail processing, the self-service kiosk is further configured to provide the interface to complete release forms, pay a bail amount by credit card, cash, or check.

3. The system of claim 1, wherein the communication portal is configured to automatically provide a real-time three-way telephone communication connection between a service provider selected by the detainee, the detainee, and a third party in response to a determination by the risk assessment module that the detainee is eligible for partial self-service bail processing.

4. The system of claim 1, wherein, based upon a detainee's current reason for being detained being a serious offense and/or the detainee's prior arrest history preventing expedited release, a detainee is ineligible for self-service bail processing.

5. The system of claim 4, wherein the self-service kiosk provides access to the self-service kiosk or a communication terminal to select and and/or contact one or more of the service providers and/or a third party.

6. The system of claim 1, wherein the self-service kiosk is a personal digital assistant.

7. A detainee assistance system, comprising:
a processor;
a self-service kiosk including an interface for completing a level of self-service processing and a communication terminal to select and contact one or more service providers;
a communication portal; and
memory storing instructions that cause the processor to perform operations comprising:
accepting data input by service providers, via the internet, to create and store one or more service provider profiles in the memory;
accepting data input by law enforcement providers to create and store one or more detainee profiles in the memory;
accessing one or more outside databases, via the internet, to obtain one or more risk metrics associated with each detainee;
obtaining one or more risk metrics associated with each detainee from the detainee profile;
creating risk profiles associated with the detainee profiles based on the risk metrics associated with each detainee, the detainee risk metrics comprising a current reason for being detained, prior arrest history, credit history, money in hand, and personal information;
determining, from each detainee profile, an eligibility of self-service processing for each detainee based upon the risk metrics, the eligibility being either eligible or not eligible for self-service bail processing;
in response to a determination that that a detainee is not eligible for self-service bail processing:
providing an initial real-time telephone communication between a service provider selected by the detainee;
identifying, from each detainee profile, a third party associated with the detainee;

accessing one or more outside databases, via the internet, to obtain one or more risk metrics associated with the third party;
obtaining one or more risk metrics associated with the third party from the detainee's profile;
creating a risk profile associated with the third party based on the risk metrics associated with the third party, the third party risk metrics comprising credit history and personal information; and
automatically providing a real-time three-way telephone communication connection between the service provider selected by the detainee, the detainee, and the third party based on the risk profile associated with the third party.

8. The system of claim 7, further comprising instructions for causing the processor to perform the steps of:
when a detainee is eligible for self-service processing, determining, based on the detainee's current reason for being detained and prior arrest history, whether the detainee is eligible for full or partial self-service bail processing; and
in response to a determination that the level of self-service processing is partial self-service bail processing, providing a real-time three-way telephone communication between a service provider selected by the detainee, the detainee, and the third party.

9. The system of claim 8, further comprising instructions for causing the processor to perform the steps of:
providing the real-time three-way telephone communication between the service provider selected by the detainee, the detainee with partial self-service bail processing, and the third party based on the risk profile associated with the third party.

10. The system of claim 7, wherein the determination that the detainee is not eligible for self-service bail processing is based upon the detainee's current reason for being detained being a serious offense and/or that the detainee's prior arrest history preventing expedited release.

11. The system of claim 7, wherein self-service kiosk and/or communications portal is a personal digital assistant.

12. A detainee assistance system, comprising:
a processor;
a self-service kiosk including an interface for completing a level of self-service processing and a communication terminal to select and contact one or more service providers;
a communication portal; and
memory storing instructions that cause the processor to perform operations comprising:
establishing parameters for an owner or operator of the detainee assistance system to provide bail services to detainees;
accepting data input by law enforcement providers to create and store one or more detainee profiles in the memory;
accessing one or more outside databases, via the internet, to obtain one or more risk metrics associated with each detainee;
obtaining one or more risk metrics associated with each detainee from the detainee profile;
creating risk profiles associated with the detainee profiles based on the risk metrics associated with each detainee, the detainee risk metrics comprising a current reason for being detained, prior arrest history, credit history, money in hand, and personal information;

determining, from each detainee profile, a level of self-service processing for each detainee based upon the risk metrics, the level being either full or partial self-service bail processing;

in response to a determination that the level of self-service processing is partial self-service bail processing:

providing an initial real-time telephone communication between a service provider selected by the detainee;

identifying, from each detainee profile, a third party associated with the detainee;

accessing one or more outside databases, via the internet, to obtain one or more risk metrics associated with the third party;

obtaining one or more risk metrics associated with the third party from the detainee's profile; and creating a risk profile associated with the third party based on the risk metrics associated with the third party, the third party risk metrics comprising credit history and personal information.

13. The system of claim 12, wherein the self-service kiosk is further configured to provide an interface to complete release forms and pay a bail bond fee to the owner or operator of the detainee assistance system by credit card, cash, or check in response to acceptance of the offer by the detainee.

14. The system of claim 12, wherein the communication portal is configured to automatically provide a real-time three-way telephone communication connection between a service provider selected by the detainee, the detainee, and a third party in response to a determination by the risk assessment module that the detainee is eligible for partial self-service bail processing.

* * * * *

UNITED STATES PATENT AND TRADEMARK OFFICE
CERTIFICATE OF CORRECTION

PATENT NO. : 10,796,392 B1  
APPLICATION NO. : 15/727995  
DATED : October 6, 2020  
INVENTOR(S) : Sidler et al.

Page 1 of 1

It is certified that error appears in the above-identified patent and that said Letters Patent is hereby corrected as shown below:

In the Claims

In Column 25, Line 25, Claim 5, delete "and and/or" and insert -- and/or -- therefor.

In Column 25, Line 61, Claim 7, delete "that that" and insert -- that -- therefor.

Signed and Sealed this  
Third Day of November, 2020

Andrei Iancu  
*Director of the United States Patent and Trademark Office*